US007068874B2

(12) United States Patent
Wang et al.

(10) Patent No.: US 7,068,874 B2

(45) Date of Patent: Jun. 27, 2006

(54) MICROFLUIDIC SORTING DEVICE

(75) Inventors: Mark Wang, San Diego, CA (US); Erhan Polatkan Ata, San Diego, CA (US); Sadik C. Esener, Solana Beach, CA (US)

(73) Assignee: The Regents of the University of California, Oakland, CA (US)

( * ) Notice: Subject to any disclaimer, the term of this patent is extended or adjusted under 35 U.S.C. 154(b) by 27 days.

(21) Appl. No.: 10/848,972

(22) Filed: May 18, 2004

(65) Prior Publication Data

US 2005/0164158 A1 Jul. 28, 2005

Related U.S. Application Data

(63) Continuation of application No. 09/998,012, filed on Nov. 28, 2001, now Pat. No. 6,778,724.

(60) Provisional application No. 60/253,644, filed on Nov. 28, 2000.

(51) Int. Cl.

*G02B 6/26* (2006.01)
*H01S 3/00* (2006.01)
*G01N 27/26* (2006.01)

(52) U.S. Cl. .................... 385/16; 250/551; 250/432 R; 385/147

(58) Field of Classification Search ............ 385/14–19, 385/147; 250/251, 432 R See application file for complete search history.

(56) References Cited

U.S. PATENT DOCUMENTS 3,558,877 A 1/1971 Pressman
3,628,182 A 12/1971 Ashkin et al
3,638,139 A 1/1972 Ashkin et al.
3,662,183 A 5/1972 Ashkin et al.
3,710,279 A 1/1973 Ashkin
3,725,810 A 4/1973 Ashkin et al.

(Continued)

FOREIGN PATENT DOCUMENTS

DE 4326181 A1 2/1995

(Continued)

OTHER PUBLICATIONS

Li, et al.; Transport, Manipulations, and Reaction of Biological Cells On-Chip Using Electrokinetic Effects; Apr. 15, 1997; Analytical Chemistry, vol. 69, No. 8, pp. 1564-1568.

(Continued)

*Primary Examiner*—Akm Enayet Ullah
(74) *Attorney, Agent, or Firm*—Fish & Richardson P.C.

(57) ABSTRACT

Small particles, for example 5 μm diameter microspheres or cells, within, and moving with, a fluid, normally water, that is flowing within microfluidic channels within a radiation-transparent substrate, typically molded PDMS clear plastic, are selectively manipulated, normally by being pushed with optical pressure forces, with laser light, preferably as arises from VCSELs operating in Laguerre-Gaussian mode, at branching junctions in the microfluidic channels so as to enter into selected downstream branches, thereby realizing particle switching and sorting, including in parallel. Transport of the small particles thus transpires by microfluidics while manipulation in the manner of optical tweezers arises either from pushing due to optical scattering force, or from pulling due to an attractive optical gradient force. Whether pushed or pulled, the particles within the flowing fluid may be optically sensed, and highly-parallel, low-cost, cell- and particle-analysis devices efficiently realized, including as integrated on bio-chips.

50 Claims, 8 Drawing Sheets

U.S. PATENT DOCUMENTS

| | | | | |
|---|---|---|---|---|
| 3,761,721 | A | 9/1973 | Altshuler et al. | |
| 3,778,612 | A | 12/1973 | Ashkin | |
| 3,793,541 | A | 2/1974 | Ashkin et al. | |
| 3,808,432 | A | 4/1974 | Ashkin | |
| 3,808,550 | A | 4/1974 | Ashkin | |
| 4,063,106 | A | 12/1977 | Ashkin et al. | |
| 4,092,535 | A | 5/1978 | Ashkin et al. | |
| 4,127,329 | A | 11/1978 | Chang et al. | |
| 4,247,815 | A | 1/1981 | Larsen et al. | |
| 4,253,846 | A | 3/1981 | Smythe et al. | |
| 4,327,288 | A | 4/1982 | Ashkin et al. | |
| 4,386,274 | A | 5/1983 | Altshuler | |
| 4,390,403 | A | 6/1983 | Batchelder | |
| 4,440,638 | A | 4/1984 | Judy et al. | |
| 4,451,412 | A | 5/1984 | Loiseaux et al. | |
| 4,453,805 | A | 6/1984 | Ashkin et al. | |
| 4,520,484 | A | 5/1985 | Huignard et al. | |
| 4,536,657 | A | 8/1985 | Bruel | |
| 4,627,689 | A | 12/1986 | Asher | |
| 4,632,517 | A | 12/1986 | Asher | |
| 4,756,427 | A | 7/1988 | Göhde | |
| 4,827,125 | A | 5/1989 | Goldstein | |
| 4,886,360 | A | 12/1989 | Finlan | |
| 4,887,721 | A | 12/1989 | Martin et al. | |
| 4,893,886 | A | 1/1990 | Ashkin | |
| 4,908,112 | A | 3/1990 | Pace | |
| 5,029,791 | A | 7/1991 | Ceccon et al. | |
| 5,079,169 | A | 1/1992 | Chu et al. | |
| 5,100,627 | A | 3/1992 | Buican et al. | |
| 5,113,286 | A | 5/1992 | Morrison | |
| 5,121,400 | A | 6/1992 | Verdiell et al. | |
| 5,170,890 | A | 12/1992 | Wilson et al. | |
| 5,189,294 | A | 2/1993 | Jackson et al. | |
| 5,198,369 | A | 3/1993 | Itoh et al. | |
| 5,206,504 | A | 4/1993 | Sridharan | |
| 5,212,382 | A | 5/1993 | Sasaki et al. | |
| 5,245,466 | A | 9/1993 | Burns et al. | |
| 5,274,231 | A | 12/1993 | Chu et al. | |
| 5,283,417 | A | 2/1994 | Misawa et al. | |
| 5,308,976 | A | 5/1994 | Misawa et al. | |
| 5,327,515 | A | 7/1994 | Anderson et al. | |
| 5,337,324 | A | 8/1994 | Ohtsu et al. | |
| 5,338,930 | A | 8/1994 | Chu et al. | |
| 5,343,038 | A | 8/1994 | Nishiwaki et al. | |
| 5,355,252 | A | 10/1994 | Haraguchi | |
| 5,360,764 | A | 11/1994 | Celotta et al. | |
| 5,363,190 | A | 11/1994 | Inaba et al. | |
| 5,364,744 | A | 11/1994 | Buican et al. | |
| 5,374,566 | A | 12/1994 | Iranmanesh | |
| 5,445,011 | A | 8/1995 | Ghislain et al. | |
| 5,452,123 | A | 9/1995 | Asher et al. | |
| 5,473,471 | A | 12/1995 | Yamagata et al. | |
| 5,495,105 | A | 2/1996 | Nishimura et al. | |
| 5,512,745 | A | 4/1996 | Finer et al. | |
| 5,608,519 | A | 3/1997 | Gourley et al. | |
| 5,620,857 | A | 4/1997 | Weetall et al. | |
| 5,625,484 | A | 4/1997 | Coutsomitros | |
| 5,629,802 | A | 5/1997 | Clark | |
| 5,631,141 | A | 5/1997 | Sonek et al. | |
| 5,637,458 | A | 6/1997 | Frankel et al. | |
| 5,644,588 | A | 7/1997 | Misawa | |
| 5,653,859 | A | 8/1997 | Parton et al. | |
| 5,659,561 | A | 8/1997 | Torruellas et al. | |
| 5,674,743 | A | 10/1997 | Ulmer | |
| 5,689,109 | A | 11/1997 | Schutze | |
| 5,694,216 | A | 12/1997 | Riza | |
| 5,760,395 | A | 6/1998 | Johnstone | |
| 5,770,856 | A | 6/1998 | Fillard et al. | |
| 5,773,298 | A | 6/1998 | Lynggaard et al. | |
| 5,776,674 | A | 7/1998 | Ulmer | |
| 5,793,485 | A | 8/1998 | Gourley | |
| 5,795,457 | A | 8/1998 | Pethig et al. | |
| 5,804,436 | A | 9/1998 | Okun et al. | |
| 5,814,200 | A | 9/1998 | Pethig et al. | |
| 5,858,192 | A | 1/1999 | Becker et al. | |
| 5,888,370 | A | 3/1999 | Becker et al. | |
| 5,900,160 | A | 5/1999 | Whitesides et al. | |
| 5,919,646 | A | 7/1999 | Okun et al. | |
| 5,935,507 | A | 8/1999 | Morito et al. | |
| 5,939,716 | A | 8/1999 | Neal | |
| 5,942,443 | A | 8/1999 | Parce et al. | |
| 5,950,071 | A | 9/1999 | Hammond et al. | |
| 5,952,651 | A | 9/1999 | Morito et al. | |
| 5,953,166 | A | 9/1999 | Shikano et al. | |
| 5,956,106 | A | 9/1999 | Petersen et al. | |
| 5,993,630 | A | 11/1999 | Becker et al. | |
| 5,993,631 | A | 11/1999 | Parton et al. | |
| 5,993,632 | A | 11/1999 | Becker et al. | |
| 6,015,714 | A | 1/2000 | Baldarelli et al. | |
| 6,033,546 | A | 3/2000 | Ramsey | |
| 6,055,106 | A | 4/2000 | Grier et al. | |
| 6,067,859 | A | 5/2000 | Kas et al. | |
| 6,071,394 | A | 6/2000 | Cheng et al. | |
| 6,074,725 | A | 6/2000 | Kennedy | |
| 6,078,681 | A | 6/2000 | Silver | |
| 6,082,205 | A | 7/2000 | Zborowski et al. | |
| 6,088,097 | A | 7/2000 | Uhl | |
| 6,088,376 | A | 7/2000 | O'Brien et al. | |
| 6,096,509 | A | 8/2000 | Okun et al. | |
| 6,111,398 | A | 8/2000 | Graham | |
| 6,121,603 | A | 9/2000 | Hang et al. | |
| 6,139,831 | A | 10/2000 | Shivashankar et al. | |
| 6,142,025 | A | 11/2000 | Zborowski et al. | |
| 6,143,558 | A | 11/2000 | Kopelman et al. | |
| 6,149,789 | A | 11/2000 | Benecke et al. | |
| 6,159,749 | A | 12/2000 | Liu | |
| 6,197,176 | B1 | 3/2001 | Pethig et al. | |
| 6,208,815 | B1 | 3/2001 | Seidel et al. | |
| 6,215,134 | B1 | 4/2001 | O'Brien et al. | |
| 6,221,654 | B1 | 4/2001 | Quake et al. | |
| 6,224,732 | B1 | 5/2001 | Imasaka et al. | |
| 6,242,209 | B1 | 6/2001 | Ransom et al. | |
| 6,280,960 | B1 | 8/2001 | Carr | |
| 6,280,967 | B1 | 8/2001 | Ransom et al. | |
| 6,287,758 | B1 | 9/2001 | Okun et al. | |
| 6,287,776 | B1 | 9/2001 | Hefti et al. | |
| 6,287,832 | B1 | 9/2001 | Becker et al. | |
| 6,287,874 | B1 | 9/2001 | Hefti | |
| 6,294,063 | B1 | 9/2001 | Becker et al. | |
| 6,344,325 | B1 | 2/2002 | Quake et al. | |
| 6,399,397 | B1 | 6/2002 | Zarling et al. | |
| 6,488,895 | B1 | 12/2002 | Kennedy | |
| 6,509,085 | B1 | 1/2003 | Kennedy | |
| 6,514,722 | B1 | 2/2003 | Palsson et al. | |
| 6,734,436 | B1 * | 5/2004 | Faris et al. | 250/432 R |
| 6,744,038 | B1 * | 6/2004 | Wang et al. | 250/251 |
| 6,815,664 | B1 * | 11/2004 | Wang et al. | 250/251 |
| 6,833,542 | B1 * | 12/2004 | Wang et al. | 250/251 |
| 2002/0045272 | A1 | 4/2002 | McDevitt et al. | |
| 2002/0058332 | A1 * | 5/2002 | Quake et al. | 435/288.3 |
| 2002/0094533 | A1 | 7/2002 | Hess et al. | |
| 2003/0032204 | A1 | 2/2003 | Walt et al. | |
| 2003/0047676 | A1 | 3/2003 | Grier et al. | |
| 2005/0121604 | A1 * | 6/2005 | Mueth et al. | 250/251 |

FOREIGN PATENT DOCUMENTS

| | | | |
|---|---|---|---|
| EP | 0635994 | B1 | 9/1998 |
| EP | 0556748 | B1 | 10/1998 |
| EP | 0898493 | B1 | 1/2000 |
| JP | 03101419 | A | 4/1991 |
| JP | 05088107 | A | 4/1993 |
| JP | 05232398 | A | 9/1993 |
| JP | 06123886 | A | 5/1994 |

| | | | |
|---|---|---|---|
| JP | 06132000 | A | 5/1994 |
| JP | 08234110 | A | 9/1996 |
| JP | 09043434 | A | 2/1997 |
| JP | 10048102 | A | 2/1998 |
| JP | 10062332 | A | 3/1998 |
| JP | 11218691 | A | 8/1999 |
| WO | WO 94/08221 | A1 | 4/1994 |
| WO | WO 97/21832 | A1 | 6/1997 |
| WO | WO 99/61888 | | 2/1999 |
| WO | WO 99/39190 | A1 | 8/1999 |
| WO | WO 99/61888 | A2 | 12/1999 |
| WO | WO 00/23825 | A2 | 4/2000 |
| WO | WO 00/45160 | A1 | 8/2000 |
| WO | WO 00/45170 | A2 | 8/2000 |
| WO | WO 00/45179 | A2 | 8/2000 |
| WO | WO 00/54882 | A1 | 9/2000 |
| WO | WO 01/05514 | A1 | 1/2001 |
| WO | WO 01/09606 | A1 | 2/2001 |
| WO | WO 01/11333 | A2 | 2/2001 |
| WO | WO 01/14870 | A1 | 3/2001 |
| WO | WO 01/20329 | A2 | 3/2001 |
| WO | WO 01/32930 | A1 | 5/2001 |
| WO | WO 01/40454 | A1 | 6/2001 |
| WO | WO 01/40769 | A2 | 6/2001 |
| WO | WO 01/44852 | A2 | 6/2001 |
| WO | WO 01/68110 | A1 | 9/2001 |
| WO | WO 02/22774 | A1 | 3/2002 |

OTHER PUBLICATIONS

Mihrimah et al.; Heterogeneous Integration through Electrokinetic Migration; Nov./Dec. 2001; IEEE Engineering in Medicine and Biology; pp. 144-151.
Swanson, et al.; A fully multiplexed CMOS biochip for DNA Analysis; 2000; Sensors and Actuators B 64; pp. 22-30.
Zeidler; Automated chromosome analysis; Aug. 1988; Nature, vol. 334, No. 6183; pp. 635.
Ackerson et al, "Radiation Pressure As A Technique For Manipulation The Particle Order In Colloidal Suspensions", Faraday Discuss. Chem. Soc., 83, 1987, 309-316.
Afzal et al, "Optical Tweezers Using A Diode Laser", Rev. Sci. Instrum., 63, 4, Apr. 1992, 2157-2163.
Amato, "Optical Matter Emerges Under Laser", Science News, 136, 1989, 212.
Asher et al, "Crystalline Colloidal Bragg Diffraction Devices: The Basis For A New Generation Of Raman Instrumentation", Spectroscopy, 1, 12, 1988, 26-31.
Ashkin , "Acceleration & Trapping Of Particles by Radiation Pressure", Physical Review Letters, 24, 4, Jan. 26, 1970, 156-159.
Ashkin, "Trapping Of Atoms By Resonance Radiation Pressure", Physical Review Letters, 40, 12, Mar. 20, 1978, 729-732.
Ashkin, "Applications Of Laser Radiation Pressure", Science, 210, 4474, Dec. 5, 1980, 1081-1088.
Ashkin, "Forces Of A Single Beam Gradient Laser Trap On A Dielectric Sphere In The Ray Optics Regime", Biophys.J., 61, Feb. 1992, 569-582.
Ashkin et al, "Observation Of A Single Beam Gradient Force Optical Trap For Dielectric Particles", Optics Letters, 11, 5, May 1986, 288-290.
Ashkin et al, "Optical Trapping & Manipulation Of Viruses & Bacteria", Science, 235, 4795, Mar. 20, 1987, 1517-1520.
Ashkin et al, "Optical Trapping & Manipulation Of Single Cells Using Infrared Laser Beams", Nature, 330, 6150, Dec. 24-31,1987, 769-771.
Ashkin et al, "Force Generation Of Organelle Transport Measured In Vivo By An Infrared Laser Trap", Nature, 348, Nov. 22, 1990. 346-348.
Ashkin et al, "Internal Cell Manipulation Using Infrared Laser Traps", Proc. Natl. Acad. Sci. USA, 86, 20, Oct. 1989, 7914-7918.
Ashkin et al., "Optical Levitation By Radiation Pressure", Appl.Phys.Lett., 19, 8, Oct. 15, 1971, 283-285.
Ashkin, "Optical Trapping & Manipulation Of Neutral Particles Using Lasers", Proc.Natl.Acad.Sci.USA, 94, 10, May 13, 1997, 4853-4860.
Aviva website printout, www.avivabio.com.
Bagnato et al, "Continuous Stopping & Trapping Of Neutral Atoms", Physical Review Letters, 58, 21, May 25, 1987, 2194-2197
Becker et al, "Separation Of Human Breast Cancer Cells From Blood By Differential Dielectric Arrinity", Proc. Natl. Acad. Sci. USA, 92, Jan. 1995, 860-864.
Berns et al, "Use Of A Laser Induced Optical Force Trap To Study Chromosome Movement On the Mitotic Spindle", Proc. Natl. Acad. Sci. USA, 86, 12 Jun. 1989, 4539-4543.
Berns et al, "Laser Microbeam As A Tool In Cell Biology: A Survey Of Cell Biology", *International Review Of Cytology*, 129, 1991,1-44 (Academic Press: San Diego).
Biegelow et al, "Observation Of Channeling Of Atoms In The Three Dimensional Interference Pattern Of Optical Standing Waves", Physical Review Letters, 65, 1 Jul. 2, 1990, 29-32.
Block et al., "Compliance Of Bacterial Flagella Measurement Without Optical Tweezers", Nature, 338, 6215, Apr. 6, 1989, 514-518.
Block, "Optical Tweezers: A New Tool For Biophysics", *NonInvasive Techniques In Cell Biology*, chap 15, 1990, 375-402. (Wiley-Liss Inc.: New York).
Bronkhorst et al, "A New Method To Study Shape Recovery Of Red Blood Cells Using Multiple Optical Trapping", Biophys. J., 69, 5, Nov. 1995, 1666-1673.
Buican et al., "Automated Single Cell Manipulation & Sorting By Light Trapping", Applied Optics, 26, 24, Dec. 15, 1987, 5311-5316.
Burns et al, "Optical Binding", Physical Review Letters, 63, 12, Sep. 18, 1989, 1233-1236.
Burns et al., "Optical Matter: Crystallization & Binding In Intense Optical Fields", Science, 249, 4970, Aug. 17, 1990, 749-754.
Business Week, "Is There Anything A Laser Can'T Do ?", Business Week, Oct. 30, 1989, 157.
Bustamante, "Direct Observation & Manipulation Of Single DNA Molecules Using Fluorescence Microscopy", Annu. Rev. Biophys. Biophys. Chem., 20, 1991, 415-446.
Bustamante et al., "Towards A Molecular Description Of Pulsed Field Gel Electrophoresis", Trends In Biotechnology, 11, 1993. 23-30.
Bustamante et al., "Manipulation OF Single DNA Molecules & Measurement Of Their Presistence, Length & Charge Density Under A Fluorescence Microscope", Abst. Of the 19th Mtg. Of Annual Mtg. OF Amer. Soc. For Photobiology, 53, Jun. 22, 1991, 46S (Pergamon Press: Oxford).
Caldwell, "Field-Flow Fractionation", Analytical Chemistry, 60, 17, Sep. 1, 1988, 959-971.
Chiou et al., "Interferometric Optical Tweezer", Optics Communications, 133, Jan. 1, 1997, 7-10.

Chou et al, "A Microfabricated Device for Sizing & Sorting DNA Molecules", Proc. Natl. Acad. Sci. USA, 96, Jan. 1999, 11-13.
Chowdhury et al., "Laser Induced Freezing", Physical Review Letters, 55, 8, Aug. 19, 1985, 833-836.
Chowdhury et al., "All Optical Logic Gates Using Colloids", Microwave & Optical Technology Letters, 1, 5, Jul. 1988, 175-178.
Chowdhury et al., Exchange of Letters, Science, 252, May 24, 1991.
Chu et al., "Experimental Observation Of Optically Trapped Atoms", Physical Review Letters, 57, 3, Jul. 21, 1986, 314-317.
Clark et al., "Single Colloidal Crystals", Nature, 281, 5726, Sep. 6, 1979, 57-50.
Crocker et al., Microscopic Measurement Of The Pair Interaction Potential Of Charge Stabilized Colloid, Physical Review Letters, 73, 2, Jul. 11, 1994, 352-355.
Cromie, "Scientists Bind Matter With Light", Harvard University Gazette, Oct. 13, 1989, 1, 4-5.
Davies et al, "Optically Controlled Collisions Of Biological Objects", SPIE, 3260, Jan. 25-28, 1998, 15-22.
Dholakia et al, "Optical Tweezers: The Next Generation", Physics World, Oct. 2002, 31-35.
Dufresne et al, "Optical Tweezer Arrays & Optical Substrates Created With Diffractive Optics", Review Of Scientific Instruments 69, 5, May 1998, 1974-1977.
Esener, Center For Chips With Heterogeneously Intergrated Photonics (CHIPS), DARPA Opto Centers Kickoff, Nov. 8, 2000, Dana Point, CA.
Fallman et al., "Design For Fully Steerable Dual Trap Optical Tweezers", Applied Optics, 36, 10, Apr. 1, 1997, 2107-2113.
Fisher, "The Light That Binds", Popular Science, Jan. 1990, 24-25.
Flynn et al, "Parallel Transport Of Biological Cells Using Individually Addressable VCSEL Arrays As OPtical Tweezers", Sensor & Actuators B, 87, 2002, 239-243.
Fournier et al., "Writing Diffractive Structures By Optical Trapping", SPIE, 2406, Feb. 6-8, 1995, 101-112.
Fu et al, "A Microfabricated Fluorescence Activated Cell Sorter", Nature Biotechnology, 17, Nov. 1999, 1109-1111.
Gascoyne, website printout, Dec. 1, 2000.
Gorre-Talini et al, "Sorting Of Brownian Particles By The Pulsed Application Of A Asymmetric Potential", Physical Review E, 56, 2 Aug. 1997, 2025-2034.
Grier, "New Age Crystals", Nature, 389, 6653, Oct. 23, 1997, 784-785.
Greulich et al, "The Light Microscope On Its Way From An Analytical To A Preparative Tool", Journal Of Microscopy, 167, Pt. 2, Aug. 1, 1992, 127-151.
Gurrieri et al, "Imaging Of Kinked Configurations Of DNA Molecules Undergoing Orthogonal Field Alternating Gel Electophoresis By Fluorescemce Microscope", Biochemistry, 29, 13, Apr. 3, 1990, 3396-3401.
Gurrieri et al. Trapping Of Megabase Sized DNA Molecules During Agarose Gel Electrophoresis, Proc. Natl. Acad. Sci. USA, 96, Jan. 1999, 453-458.
Holtz et al, "Polymerized Colloidal Crystal Hydrogel Films As Intelligent Chemical Sensing Materials", Nature, 389, Oct. 23, 1997, 829-832.
Houseal et al, "Imaging Of The Motions & Conformational Transitions Of Single DNA Molecules Using Flourescence Microscopy", Biophys.J., 55, 324, Feb. 12-16, 1989, 373a.
Houseal et al., "Real Time Imaging Of Single DNA Molecules With Fluorescence Microscopy", Biophys.J., 56, Sep. 1989, 507-516.
Huber et al., "Isolation Of A Hyperthermophilic Archaeum Predicted By in situ RNA Analysis", Mature, 376, 6535, Jul. 6, 1995, 57-58.
Imasaka et al., "Optical Chromatography", Analytical Chemistry, 67, 11, Jun. 1, 1995, 1763-1765.
Inside R&D, "Matter Bound By Light", Inside R&D, 18, 43, Oct. 25, 1989, 2.
Kuo et al., "Optical Tweezers In Cell Biology", Trends In Cell Biology, 2 Apr. 1992, 116-118.
Lai, Detemination Of Spring Constant Of Laser Trapped Particle By Self-Mining Interferometry. Proc. Of SPIE, 3921, 2000, 197-204.
Law, "Matter Rides On Ripples Of Light", New Scientist, 1691, Nov. 16, 1989, 1691.
Leger et al, "Coherent Laser Addition Using Binary Phase Gratings", Applied Optics, 26, 20, Oct. 15, 1987, 4391-4393.
Mammen et al, "Optically Controlled Collisions Of Biological Objects To Evaluate Potent Polyvalent Inhibitors Of Virus-Cell Adhesion", Chemistry & Biology, 3, 9, Sep. 1996, 757-763.
Mason et al, "Optical Measurements Of Frequency Dependent Linear Viscoelastic Modull Of Complex Fluids", Physical Review Letters, 74, 7, Feb. 13, 1995, 1250-1523.
McClelland et al, "Low Frequency Peculiarities Of the Photorefractive Response In Sillenites", Optics Communications, 113, Jan. 1, 1995, 371-377.
Misawa et al, "Spatial Pattern Formation, Size Selection, & Directional Flow Of Polymer Latex Particles By Laser Trapping Technique", Chemistry Letters, 3, Mar. 1991, 469-472.
Misawa et al, "Multibeam Laser Manipulation & Fixation of Microparticles", Appl.Phys.Lett, 60, 3, Jan. 20, 1992, 310-312.
Mitchell et al, "A Parctical Optical Trap For Manipulating & Isolating Bacterial from Complex Microbial Communities", Microb.Ecol., 25, 2, 1993, 113-119.
Murray et al, "Experimental Observation Of Two Stage Melting In A Classical Two Dimensional Screened Coulomb System", Physical Review Letters, 58, 12, Mar. 23, 1987, 1200-1203.
Murray et al, "Colloidal Crystals", American Scientist, 83, 3, May-Jun. 1995, 238-245.
MYCOMETRIX, website printout, www.mycometix.com, Dec. 1, 2000.
New York Times, "Atoms Bound Together By Light", New York Times, Oct. 31, 1989, C17.
Paterson et al, "Controlled Rotation Of optically Trapped Microscopic Particles", Science, 292, May 4, 2001, 912-914.
Pritchard et al., "Light Traps Using Spontaneous Forces", Physical Review Letters, 57, 3, Jul. 21, 1986, 310-313.
Quake et al, "From Micro- to Nanofabrication With Soft Materials", Science, 290, Nov. 24, 2000, 1536-1540.
Raab et al, "Trapping Of Neutral Sodium Atoms With Radiation Pressure", Physical Review Letters, 59, 23, Dec. 7, 1987, 2631-2634.
Rogovin et al, "Bifurcation In Degenerate Four-Wave Mixing In Liquid Suspensions Of Microspheres", Physical Review Letters, 54, 20, May 20, 1985, 2222-2225.

Roosen, "A Theoretical & Experimental Study Of The Stable Equilibrium Positions Of Spheres Levitated By Two Horizontal Laser Beams", Optics Communications, 21, 1, Apr. 1977, 189-194.
Sasaki et al, "Laser Scanning Micromanipulation & Spatial Patterning Of Fine Particles", Japanese Journal Of Applied Physics, 31, 5B, May 1991, L907-L909.
Sasaki et al, "Pattern Formation & Flow Control Of Fine Particles By Laser Scanning Micromanipulation", Optics Letters, 16, 19, Oct. 1, 1991, 1463-1465.
Sasaki et al., "Optical Micromanipulation Of A Lasing Polymer Particle In Water", Japanese Journal Of Applied Physics, Pt. 2, 32, 8B, Aug. 15, 1993, L1144-L1147.
Sasaki et al, "Optical Trapping Of A Metal Particle & A Water Droplet By A Scanning Laser Beam", Appl. Phys. Lett., 60, 7, Feb. 17, 1992, 807-809.
Shikano et al, "Separation Of A Single Cell By Red-Laser Manipulation", Applied Physics Letters, 75, 17, Oct. 25, 1999, 2671-2673.
Smith et al, "Four Wave Mixing In An Artificial Kerr Medium", Optics Letters, 6, 6, June. 1981, 284-286.
Smith et al, "Direct Mechnical Measurements Of The Elasticity Of Single DNA Molecules By Using Magnetic Beads", Science, 258, 5085, Nov. 13, 1992, 1122-1126.
Smith et al, "Model & Computer Simulations Of The Motion Of DNA Molecules During Pulsed Field Gel Electrophoresis", Biochemistry, 30, 21, May 28, 1991, 5264-5274.
Sonek et al, "Micromanipulation & Physical Monitoring Of Cells Using Two-Photon Excited Fluorescence In CW Laser Tweezers", SPIE, 2678, Jan. 28-Feb. 1, 1996, 62-68.
Suzuki et al, "Hysteric Behavior & Irreversibility Of Polymer Gels By pH Change", J. Chem. Phys., 103, 11, Sep. 15, 1995, 4706-4710.
Suzuki et al., "Optical Switching In Polymer Gels", J. Appl. Phys., 80, 1, Jul. 1, 1996, 131-136.
Svoboda et al, "Biological Applications In Optical Forces", Annu. Rev. Biophys. Biomol. Struct., 23, 1994, 247-285.
Svobada et al, Conformation & Elasticity Of The Isolated Red Blood Cell Membrane Skeleton, Biophys. J., 63, 3, Sep. 1, 1992, 784-793.
Swanson et al, "Diffractive Optical Elements For Use In Infrared Systems", Optical Engineering, 28, 6, Jun. 1989, 605-608.
Takashima et al., "Dielectric Dispersion Of DNA", J. Mol. Biol., 7, 5, Nov. 1963, 455-467.
Thirunamachandran, "Intramolecular Interactions In The Pressence Of An Intense Radiation Field ", Molecular Physics, 40, 2, 1980, 393-399.
Unger et al, "Monolithic Microfabricated Valves & Pumps By Multilayer Soft Lithography", Science, 288, Apr. 7, 2000, 113-116.
VanBlaaderen et al, "Template Directed Colloidal Crystallization", Nature, 385, 6614, Jan. 23, 1997, 321-324.
Visscher et al, "Construction Of Multiple Beam Optical Traps With Nanometer Resolution Position Screening", IEEE Jnl Of Selected Topics In Quantum Electronics, 2, 4, Dec. 1996, 1066-1075.
Wang et al, "All Optical Switching Of Biological Samples In A Microfluidic Device", International Phonics Conference 2000, Dec. 12-15, 2000, Hisinchu, Taiwan.
Wang et al, "Integration Of Optoelectronic Array Devices For Cell Transport & Sorting", Photonics West 2001, Jan. 20-26, 2001, San Jose, CA.
Weber et al, "Manipulation Of Cells, Organelles & Genomes By Laser Microbeam & Optical Trap", Intl. Rev. Of Cytology, 133, 1992, 1-41, (Academic Press: San Diego).
Wei et al, Laser Trapping Microscopy As A Diagnostic Technique For The Study Of Cellular Response & Laser-Cell Interactions, SPIE, 2983, Feb. 10-11, 1997, 22-28.
Westbrook et al, "Locatization Of Atoms In A Tree Dimensional Standing Wave", Physical Review Letters, 65, 1, Jul. 2, 1990, 33-36.
Wheeler, "Force Fields Of Laser Light Bind Molecules In A Remarkable Discovery At Harvard", The Chronicle Of Higher Education, Oct. 25, 1989, A4.
Wright et al, "Radiation Trapping Forces On Microspheres With Optical Tweezers", Appl. Phys. Lett., 63, 6 Aug. 9, 1993.
Wuite et al, "An Integrated Laser Trap/Flow Control Video Microscope For The Study Of Single Biomolecules", Biophys. Jnl., 79, 2, Aug. 2000, 1155-1167.
Xiang et al, "A Combinatorial Approach To Materials Discovery", Science, 368, 5218, Jun. 23, 1995, 1738-1740.
Yablonovitch, "Inhibited Spontaneous Emission In Solid State Physics & Electronics", Physical Review Letters, 58, 20, May 18, 1987, 2059-2062.
Yablonovitch et al, "Photonic Band Structure: The Face Centered Cubic Face", Physical Review Letters, 63, 18, Oct. 30, 1989, 1950-1953.
Yuqiu, "Mechanical, Electrical, & Chemical Manipulation Of Single DNA Molecules", Nanotechnology, 3, 1992, 16-20.
Zahn et al, "Fluorimetric Multiparameter Cell Assay At The Single Cell Level Fabricated By Optical Tweezers", FEBS Letters, 443, 1999, 337-340.

* cited by examiner

MICROFLUIDIC SORTING DEVICE

CROSS-REFERENCE TO RELATED APPLICATIONS

This application is a continuation (and claims the benefit of priority under 35 USC 120) of U.S. patent application Ser. No. 09/998,012 filed Nov. 28, 2001 now U.S. Pat No. 6,778,724; which claims priority to U.S. Provisional Application No. 60/253,644, filed Nov. 28, 2000. The disclosures of the prior applications are considered part of and are incorporated by reference in the disclosure of this application.

BACKGROUND OF THE INVENTION

1. Field of the Invention

The present invention generally concerns optical tweezers, microfluidics, flow cytometry, biological Micro Optical Electro Mechanical Systems (Bio-MOEMS), Laguerre-Gaussian mode emissions from Vertical Cavity Surface Emitting Lasers (VCSELs), cell cytometry and microfluidic switches and switching.

The present invention particularly concerns the sorting of microparticles in fluid, thus a "microfluidic sorting device"; and also the directed movement, particularly for purposes of switching, of microparticles based on the transference of momentum from photons impinging on the microparticles, ergo "photonic momentum transfer".

2. Description of the Prior Art 2.1 Background to the Functionality of the Present Invention In the last several years much attention has been paid to the potential for lab-on-a-chip devices to significantly enhance the speed of biological and medical research and discovery. See P. Swanson, R. Gelbart, E. Atlas. L. Yang, T. Grogan, W. F. Butler, D. E. Ackley, and C. Sheldon. "A fully multiplexed CMOS biochip for DNA analysis," Sensors and Actuators B 64, 22–30 (2000). See also M. Ozkan, C. S. Ozkan, M. M. Wang, O. Kibar, S. Bhatia, and S. C. Esener, "Heterogeneous Integration of Biological Species and Inorganic Objects by Electrokinetic Movement," IEEE Engineering in Medicine and Biology, in press.

The advantages of such bio-chips that have been demonstrated so far include the abilities to operate with extremely small sample volumes (on the order of nanoliters) and to perform analyses at much higher rates than can be achieved by traditional methods. Devices for study of objects as small as DNA molecules to as large as living cells have been demonstrated. See P. C. H. Li and D J, Harrison, "Transport, Manipulation, and Reaction of Biological Cells On-Chip Using Electrokinetic Effects," Anal. Chem. 69, 1564–1569 (1997).

One important capability for cell research is the ability to perform cell sorting, or cytometry, based on the type, size, or function of a cell. Recent approaches to micro-cytometry have been based on electrophoretic or electro-osmotic separation of different cell types. See A. Y. Fu, C. Spence, A. Scherer, F. H. Arnold, and S. R Quake, "A microfabricated fluorescence-activated cell sorter," Nature 17.1109–1111 (1999).

2.2 Scientific Background to the Structure of the Device of the Present Invention The present invention will be seen to employ optical tweezers. See A. Ashkin, J. M. Dziedzic, J. E. Bjorkholm, and S. Chu, "Observation of a single-beam gradient force optical trap for dielectric particles;" Opt. Lett. 11, 288–291) (1986).

The present invention will also be seen to employ microfabricated fluidic channels. See H.-P. Chou, C. Spence. A. Scherer. and S. Quake, "A microfabricated device for sizing and sorting DNA molecules," Proc. Natl. Acad. Sci. USA 96 11–13 (1999).

In previous demonstrations of the optical manipulation of objects through defined fluidic channels, photonic pressure was used to transport cells over the length of the channels. See T. N. Buican M. J. Smyth, H. A. Crissman, G. C. Salzman, C. C. Stewart, and J. C. Martin, "Automated single-cell manipulation and sorting by light trapping." Appl. Opt, 26, 3311–5316 (1987). The device of the present invention will be seen to function oppositely.

2.3 Engineering, and Patent, Background to the Structure of the Device of the Present Invention There are many existing (i) bio-chip (lab-on-a-chip) technologies, and (ii) microfluidic technologies. Most of these technologies use electrical or mechanical force to perform switching within the channels. The present invention is unique in that optics (as generate photonic pressure, or radiation pressure) is used to perform switching—particularly of small particles flowing in microfluidic channels.

2.3.1 Background Patents Generally Concerning Optical Tweezing and Optical Particle Manipulation The concept of using photonic pressure to move small particles is known. The following patents, all to Ashkin, generally deal with Optical Tweezers. They all describe the use of optical "pushing" and optical "trapping" forces, both of which are used in the present invention. These patents do not, however, teach or suggest such use of optical forces in combination with microfluidics as will be seen to be the essence of the present invention.

U.S. Pat. No. 3,710,279 to Askin, assigned to Bell Telephone Laboratories, Inc. (Murray Hill, N.J.), for APPARATUSES FOR TRAPPING AND ACCELERATING NEUTRAL PARTICLES concerns a variety apparatus for controlling by radiation pressure the motion of particle, such as a neutral biological particle, free to move with respect to its environment. A subsequent Askin patent resulting from a continuation-in-part application is U.S. Pat. No. 3,808,550.

Finally, U.S. Pat. No. 4,893,886 again to Ashkin, et al., assigned to American Telephone and Telegraph Company (New York, N.Y.) and AT&T Bell Laboratories (Murray Hill, N.J.), for a NON-DESTRUCTIVE OPTICAL TRAP FOR BIOLOGICAL PARTICLES AND METHOD OF DOING SAME, concerns biological particles successfully trapped in a single-beam gradient force trap by use of an infrared laser. The high numerical aperture lens objective in the trap is also used for simultaneous viewing. Several modes of trapping operation are presented.

2.3.2 Patents Showing Various Conjunctions of Optical Tweezing/Optical Manipulation and Microfluidics/Microchannels U.S. Pat. No. 4,887,721 to Martin, et al., assigned to Bell Telephone Laboratories, Inc. (Murray Hill, N.J.), for a LASER PARTICLE SORTER, concerns a method and apparatus for sorting particles, such as biological particles. A first laser defines an optical path having an intensity gradient which is effective to propel the particles along the path but which is sufficiently weak that the particles are not trapped in an axial direction. A probe laser beam interrogates the particles to identify predetermined phenotypical characteristics of the particles. A second laser beam intersects the driving first laser beam, wherein the second laser beam is activated by an output signal indicative of a predetermined characteristic. The second laser beam is switchable between a first intensity and a second intensity, where the first intensity is effective to displace selected particles from the driving laser beam and the second intensity is effective to propel selected particles along the deflection laser beam. The selected particles may then be propelled by the deflection beam to a location effective for further analysis.

The described particle propulsion means of Martin, et al. concerns (i) the suspension of particles by fluidics and (ii) the use of an optical pushing beam to move particles around in a cavity. The application of sorting—as is performed by certain apparatus of the present invention—is also described. However, the present invention is distinguished over U.S. Pat. No. 4,887,721 for SORTING IN MICROFLUIDICS to Martin, et al. because this patent teaches the use of optical beams to do all particle transport, while the present invention uses optical beams only for switching, with transport accomplished by microfluidic flow. In the apparatus of U.S. Pat. No. 4,887,721 a single beam pushes a particle along from one chamber to the next. It will soon be seen that in the various apparatus of the present invention continuous water flow serves to move the particles around, and optics is only used as the switch. This is a much more efficient use of photons and makes for a faster throughput device.

The Martin, et al. patent also describes (i) sensing particles by optical means, and (ii) act on the results of the sensing so as to (iii) manipulate the particles with laser light. Such optical sensing is fully compatible with the present invention.

Also involving both (i) fluidics and, separately, (ii) optical manipulation is U.S. Pat. No. 5,674,743 to Ulmer, assigned to SEQ, Ltd. (Princeton, N.J.), for METHODS AND APPARATUS FOR DNA SEQUENCING. The Ulmer patent concerns a method and apparatus for automated DNA sequencing. The method of the invention includes the steps of: a) using a processive exonuclease to cleave from a single DNA strand the next available single nucleotide on the strand; b) transporting the single nucleotide away from the DNA strand; c) incorporating the single nucleotide in a fluorescence-enhancing matrix; d) irradiating the single nucleotide to cause it to fluoresce; e) detecting the fluorescence; f) identifying the single nucleotide by its fluorescence; and g) repeating steps a) to f) indefinitely (e.g., until the DNA strand is fully cleaved or until a desired length of the DNA is sequenced). The apparatus of the invention includes a cleaving station for the extraction of DNA from cells and the separation of single nucleotides from the DNA; a transport system to separate the single nucleotide from the DNA and incorporate the single nucleotide in a fluorescence-enhancing matrix; and a detection station for the irradiation, detection and identification of the single nucleotides. The nucleotides are advantageously detected by irradiating the nucleotides with a laser to stimulate their natural fluorescence, detecting the fluorescence spectrum and matching the detected spectrum with that previously recorded for the four nucleotides in order to identify the specific nucleotide.

In one embodiment of the Ulmer apparatus an electric field applied (about 0.1–10 V/cm) via suitably incorporated electrodes to induce the chromosomes to migrate into a microchannel single-file, much as is done in an initial step of cell sorting. The individual chromosomes are visualized by the microscope system as they proceed along the microchannel. This step can also be automated by using computer image analysis for the identification of chromosomes (see Zeidler, 1988, Nature 334: 635). Bifurcations in the channel are similarly used in conjunction with selectively applied electric fields to divert the individual chromosomes into small isolation chambers. Once individual chromosomes have been isolated, the sister chromatids are separated by either a focused laser microbeam and optical tweezers, or mechanical microdissection to provide two "identical" copies for sequencing.

The present invention will be seen to use optical tweezers not only on chromosomes and the like once delivered to "chambers" by use of microchannels, but also to divert the particles within the microchannels themselves—a process that Ulmer contemplates to do only by electric fields.

U.S. Pat. No. 5,495,105 to Nishimura, et al. for a METHOD AND APPARATUS FOR PARTICLE MANIPULATION, AND MEASURING APPARATUS UTILIZING THE SAME concerns a flow of liquid containing floating fine particles formed in a flow path, thereby causing successive movement of the particles. A light beam having intensity distribution from a laser is focused on the liquid flow, whereby the particle is optically trapped at the irradiating position, thus being stopped against the liquid flow or being slowed by a braking force. This phenomenon is utilized in controlling the spacing of the particles in the flow or in separating the particles.

The present invention will be seen not to be concerned with retarding (breaking) or trapping the flow of particles in a fluid, but rather in changing the path(s) of particle flow.

The next three patents discussed are not necessarily prior art to the present invention because they have issuance dates that are later than one year prior to the priority date of the present patent application as this priority date is established by the predecessor provisional patent application, referenced above. However, these patents are mentioned for completeness in describing the general current, circa 21001, state of the art in microfluidic and/or laser manipulative particle processing, and so that the distinction of the present invention over existing alternative techniques may be better understood.

In this regard, U.S. Pat. No. 6,139,831 to Shivashankar, et al., assigned to The Rockfeller University (New York, N.Y.), for an APPARATUS AND METHOD FOR IMMOBILIZING MOLECULES ONTO A SUBSTRATE, contemplates both (i) movement by microfluidics and (ii) manipulation by optical tweezers. However, Shivashankar, et al. contemplate that these should be separate events.

The Shivashankar, et al., patent concerns an apparatus and method for immobilizing molecules, particularly biomolecules such as DNA, RNA, proteins, lipids, carbohydrates, or hormones onto a substrate such as glass or silica. Patterns of immobilization can be made resulting in addressable, discrete arrays of molecules on a substrate, having applications in bioelectronics, DNA hybridization assays, drug assays, etc. The Shivashankar, et al., invention reportedly readily permits grafting arrays of genomic DNA and proteins for real-time process monitoring based on DNA-DNA, DNA-protein or receptor-ligand interactions. In the apparatus an optical tweezer is usable as a non-invasive tool, permitting a particle coated with a molecule, such as a bio-molecule, to be selected and grafted onto spatially localized positions of a semiconductor substrate. It is recognized that this non-invasive optical method, in addition to biochip fabrication, has applications in grafting arrays of specific biomolecules within microfluidic chambers, and it is forecast by Shivashankar, et al., that optical separation methods may work for molecules as well as cells.

Well they may; however the present invention will be seen, inter alia, to employ optical tweezers on biomolecules while moving these molecules move in microchannels under microfluidic forces—as opposed to being stationary in microfluidic chambers.

U.S. Pat. No. 6,159,749 to Liu, assigned to Beckman Coulter, Inc. (Fullerton, Calif.), for a HIGHLY SENSITIVE BEAD-BASED MULTI-ANALYTE ASSAY SYSTEM USING OPTICAL TWEEZERS concerns an apparatus and method for chemical and biological analysis, the apparatus having an optical trapping means to manipulate the reaction substrate, and a measurement means. The optical trapping means is essentially a laser source capable of emitting a beam of suitable wavelength (e.g., Nd:YAG laser). The laser beam impinges upon a dielectric microparticle (e.g., a 5 micron polystyrene bead which serves as a reaction substrate), and the bead is thus confined at the focus of the laser beam by a radial component of the gradient force. Once "trapped," the bead can be moved, either by moving the beam focus, or by moving the reaction chamber. In this manner, the bead can be transferred among separate reaction wells connected by microchannels to permit reactions with the reagent affixed to the bead, and the reagents contained in the individual wells.

The patent of Liu thus describes the act of moving particles—beads—in microchannels under force of optical laser beams, or traps. However, as with the other references, Liu does not contemplate that particles moving under force of microfluidics should also be subject to optical forces.

U.S. Pat. No. 6,294,063 to Becker, et al., assigned to the Board of Regents, The University of Texas System (Austin, Tex.), for a METHOD AND APPARATUS FOR PROGRAMMABLE FLUIDIC PROCESSING concerns a method and apparatus for microfluidic processing by programmably manipulating a packet. A material is introduced onto a reaction surface and compartmentalized to form a packet. A position of the packet is sensed with a position sensor. A programmable manipulation force is applied to the packet at the position. The programmable manipulation force is adjustable according to packet position by a controller. The packet is programmably moved according to the programmable manipulation force along arbitrarily chosen paths.

It is contemplated that the "packets" may be moved along the "paths" by many different types of forces including optical forces. The forces are described to be any of dielectrophoretic, electrophoretic, optical (as may arise, for example, through the use of optical tweezers), mechanical (as may arise, for example, from elastic traveling waves or from acoustic waves), or any other suitable type of force (or combination thereof). Then, in at least some embodiments, these forces are programmable. Using such programmable forces, packets may be manipulated along arbitrarily chosen paths.

As with the other described patents, the method and apparatus of Becker, et al., does not contemplate moving with one force—microfluidics—while manipulating with another force—an optical force.

SUMMARY OF THE INVENTION

In one of its several aspects the present invention contemplates the use of optical beams (as generate photonic pressure, or radiation pressure) to perform switching of small particles that are flowing in microfluidic channels. The invention is particularly beneficial of use in bio-chip technologies where one wishes to both transport and sort cells (or other biological samples).

In its microfluidic switching aspect, the present invention contemplates the optical, or radiation, manipulation of microparticles within a continuous fluid, normally water, flowing through small, microfluidic, channels. The water flow may be induced by electro-osmosis, pressure, pumping, or whatever. A particle within a flowing fluid passes into a junction that is typically in the shape of an inverted "T" or "Y", or an "X", or, more generally, any branching of n input channels where n=1, 2, 3, . . . N, to M output channels where m=1, 2, 3, . . . M. Photonic forces serve to controllably direct a particle appearing at the junction from one of the n input channels into (i.e., "down to") one of the m output channels. The photonic forces may be in the nature of pulling forces, or, more preferably, photonic pressure forces, or both pulling and pushing forces to controllably force the particle in the desired direction and into the desired output channel. Two or more lasers may be directionally opposed so that a particle appearing at one of the n input channels may be pushed (or pulled) in either direction to one of the m output channels.

The size range of the microfluidic channels is preferably from 2 μm to 200 μm in diameter, respectively switching and sorting microparticles, including living cells, in a size range from 1 μm to 100 μm in diameter.

This microfluidic switching aspect of the present invention has two major embodiments, which embodiments are more completely expounded in the DESCRIPTION OF THE PREFERRED EMBODIMENT of this specification as section 1 entitled "All-Optical Switching of Biological Samples in a Microfluidic Device", and as section 2 entitled "Integration of Optoelectronic Array Devices for Cell Transport and Sorting". Furthermore, the "optoelectronic array devices" of the second embodiment are most preferably implemented as the VCSEL tweezers, and these tweezers are more completely expounded in the section 3 entitled "VCSEL Optical Tweezers, Including as Are Implemented as Arrays".

In a first embodiment of the microfluidic switching (expounded in section 1.) an optical tweezer trap is used to trap a particle as it enters the junction and to "PULL" it to one side or the other. In a second embodiment of the microfluidic switching (expounded in section 2.), the scattering force of an optical beam is used to "PUSH" a particle towards one output or the other. Both embodiments have been reduced to operative practice, and the choice of which embodiment to use, or to use both embodiments simultaneously, is a function of exactly what is being attempted to be maneuvered, and where. The "PUSH" solution—which can, and preferably is, also based on a VCSEL, or VCSEL array—is generally more flexible and less expensive, but produces less strong forces, than the "PULL" embodiment.

The particle passes through the optical beam only briefly, and then continues down a selected channel continuously following the fluid. Microfluidic particle switches in accordance with the present invention can be made both (i) parallel and (ii) cascadable—which is a great advantage. A specific advantage of using optics for switching is that there is no physical contact with the particle, therefore concerns of cross-contamination are reduced.

Still another attribute of the invention is found within both specific embodiments where the optical switching beam preferably enters the switching region of a microfluidic chip orthogonally to the flat face of the chip. This means that the several microfluidic channels at the junction are at varying depths, or levels, in the chip, and the switching beams serve to force a particle transversely to the flat face of the chip—"up" or "down" within the chip—to realize switching. Each optical beam is typically focused in a microfluidic junction by an external lens. This is very convenient, and eases optical design considerably. However, it will also be understood that optical beams could alternatively be entered by wave guides and/or microlenses fabricated directly within the microfluidic chip.

In another of its aspects, the present invention contemplates a new form of optical tweezer that is implemented from both (i) a Vertical Cavity Surface Emitting Laser (VCSEL) (or tweezer arrays that are implemented from arrayed VCSELs) and (ii) a VCSEL-light-transparent substrate in which are present microfluidic channels flowing fluid containing microparticles. The relatively low output power, and consequent relatively low optical trapping strength of a VCSEL, is in particular compensated for in the "microfluidic optical tweezers" of the present invention by changing the lasing, and laser light emission, mode of the VCSEL from Hermite-Gaussian to Laguerre Gaussian. This change is realized in accordance with the VCSEL post-fabrication annealing process taught within the related U.S. patent application, the contents of which are incorporated herein by reference.

The preferred VCSELs so annealed and so converted from a Hermite-Gaussian to a Laguerre-Gaussian emission mode emit light that is characterized by rotational symmetry and, in higher modal orders, close resembles the so-called "donut" mode. Light of this characteristic is optimal for tweezing; the "tweezed" object is held within the center of a single laser beam. Meanwhile the ability to construct and to control arrayed VCSELs at low cost presents new opportunities for the sequenced control of tweezing and, in accordance with the present invention, the controlled transport and switching of microparticles traveling within microfluidic channels.

1. Moving and Manipulating Small Particles, Including for Switching and Sorting

Accordingly, in one of its aspects the present invention is embodied in a method of moving, and also manipulating, small particles, including for purposes of switching and sorting.

The method of both physically (i) moving and (ii) manipulating a small particle consists of (i) placing the particle in fluid flowing in a microfluidic channel; and (ii) manipulating the particle under force of radiation as it moves in the microfluidic channel.

The method may be extended and adapted to physically spatially switching the small particle to a selected one of plural alternative destination locations. In such case the placing of the particle in fluid flowing in a microfluidic channel consists of suspending the particle in fluid flowing in a compound microfluidic channel from (i) an upstream location through (ii) a junction branching to (iii) each of plural alternative downstream destination locations. The manipulating of the particle under force of radiation as it moves in the compound microfluidic channel then consists of controlling the particle at the branching junction to move under force of radiation into a selected path leading to a selected one of the plural alternative downstream destination locations.

The controlling is preferably with a single radiation beam, the particle being suspended within the flowing fluid passing straight through the junction into a path leading to a first downstream destination location in absence of the radiation beam. However, in the presence of the radiation beam the particle deflects into an alternative, second, downstream destination location.

The controlling may alternatively be with a selected one of two radiation beams impinging on the junction from different directions. The particle suspended within the flowing fluid deflects in one direction under radiation force of one radiation beam into a first path leading to a first downstream destination location. Alternatively, the particle deflects under radiation force of the other, different direction, radiation beam into a second path leading to a second downstream destination location.

In the case of generalized switching where a particle from any of n input paths is switched to any of m output paths, the particle will enter the junction from any number of n input paths that are normally spaced parallel, and will be deflected to a varying distance in either directions so as to enter a selected one of the m output paths. The particular radiation (laser) source that is energized, and the duration of the energization, will influence how far, and in what direction, the particle moves. Clearly forcing a particle to move a long distance, as when n or m or both are large numbers >4, entails (i) longer particle transit times with (ii) increasing error. Since particles can be sorted into large numbers (m>>4) of destinations in a cascade of microfluidic switches, no single switch is normally made excessively "wide".

The controlling is preferably with a laser beam, and more preferably with a Vertical Cavity Surface Emitting (VCSEL) laser beam, and still more preferably with a VCSEL laser beam having Laguerre-Gaussian spatial energy distribution.

2. A Mechanism for Moving and Manipulating Small Particles, Including for Switching and Sorting In another of its aspects the present invention is embodied in a mechanism for moving, and also manipulating, small particles, including for purposes of switching and sorting.

The preferred small particle moving and manipulating mechanism includes (i) a substrate in which is present at least one microfluidic channel, the substrate being radiation transparent at at least one region along the microfluidic channel; (ii) a flow inducer inducing a flow of fluid bearing small particles in the microfluidic channel; and (iii) at least one radiation beam selectively enabled to pass through at least one radiation-transparent region of the substrate and into the microfluidic channel so as to there produce a manipulating radiation force on the small particles as they flow by.

This small particles moving and manipulating mechanism according can be configured and adapted as a switching mechanism for sorting the small particles. In such case the substrate's at least one microfluidic channel branches at the at least one junction. Meanwhile the flow inducer is inducing the flow of fluid bearing small particles in the at least one microfluidic channel including through the channel's at least one junction and into all the channel's branches. Still further meanwhile, the at least one radiation beam selectively passes through the radiation-transparent region of substrate and into a junction of the microfluidic channel so as to there selectively produce a radiation force on each small particle at such time as the particle should pass through the junction, which selective force will cause each small particle to enter into an associated desired one of the channel's branches. By this coaction the small particles are controllably sorted into the channel branches.

In one variant embodiment, the substrate of the switch mechanism has plural levels differing in distance of separation from a major surface of the substrate The at least one microfluidic channel branches at the at least one junction between (i) at least one, first, path continuing on the same level and (ii) another, alternative second path continuing on a different level. In operation one only radiation beam selectively acts on a small particle at the junction so as to (i) produce when ON a radiation force on the small particle at the junction that will cause the small particle to flow into the alternative second path. However, when this one radiation beam is OFF, the small particle will continue flowing upon the same level and into the first path.

3. A Small Particle Switch

In yet another of its aspects the present invention may simply be considered to be embodied in a small particle switch, or, more precisely, a switch mechanism for controllably spatially moving and switching a small particle arising from a particle source into a selected one of a plurality of particle sinks.

The switch includes a radiation-transparent microfluidic device defining a branched microfluidic channel, in which channel fluid containing a small particle can flow, proceeding from (i) particle source to (ii) a junction where the channel then branches into (iii) a plurality of paths respectively leading to the plurality of particle sinks. The switch also includes a flow inducer for inducing a flow of fluid, suitable to contain the small particle, in the microfluidic channel from the particle source through the junction to all the plurality of particle sinks. Finally, the switch includes at least one radiation beam selectively enabled to pass through the radiation-transparent microfluidic device and into the junction so as to there produce a radiation force on a small particle as it passes through the junction within the flow of fluid, therein by this selectively enabled and produced radiation force selectively directing the small particle that is within the fluid flow into a selected one of the plurality of paths, and to a selected one of the plurality of particle sinks.

In operation of the switch the small particle is physically transported in the microfluidic channel from the particle source to that particular particle sink where it ultimately goes by action of the flow of fluid within the microfluidic channel. The small particle is physically switched to a selected one of the plurality of microfluidic channel paths, and to a selected one of the plurality of particle sinks, by action of radiation force from the radiation beam.

The branched microfluidic channel of the radiation-transparent microfluidic device is typically bifurcated at the junction into two paths respectively leading to two particle sinks. The flow inducer thus induces the flow of fluid suitable to contain the small particle from the particle source through the junction to both particle sinks, while the at least one radiation beam is selectively enabled to produce a radiation force on a small particle as it passes through the junction within the flow of fluid so as to selectively direct the small particle into a selected one of the two paths, and to a selected one of the two particle sinks.

It is possible to use two radiation beams are selectively enabled to produce a radiation force on a small particle as it passes through the junction within the flow of fluid so as to selectively direct the small particle into a selected one of the two paths, and to a selected one of the two particle sinks, one of the two radiation beams being enabled to push the particle into one of the two paths and the other of the two radiation beams being enabled to push the particle into the other one of the two paths.

The preferred bifurcated junction splits into two paths one of which paths proceeds straight ahead and another of which paths veers away, the two paths respectively leading to two particle sinks. In this case preferably one radiation beam is selectively enabled to produce a radiation force on a small particle as it passes through the junction within the flow of fluid so as to push when enabled the small particle into the path that veers away, and so as to permit when not enabled that the particle will proceed in the path straight ahead.

When the bifurcated microfluidic channel of the radiation-transparent microfluidic device defines a geometric plane, then the one radiation beam is preferably substantially in the geometric plane at the junction.

4. Optical Tweezers

In still yet another of its aspects the present invention may simply be considered to be embodied in a new form of optical tweezers.

The optical tweezers have a body defining a microfluidic channel in which fluid transporting small particles flows, the body being transparent to radiation at at least some region of the microfluidic channel. A radiation source selectively acts, through the body at a radiation-transparent region thereof, on the transported small particles within the microfluidic channels. By this action the small particles (i) are transported by the fluid to a point of manipulation by the radiation source, and (ii) are there manipulated by the radiation source.

The radiation source preferably consists of one or more Vertical Cavity Surface Emitting Lasers (VCSELs), which may be arrayed in one, or in two dimensions as the number, and positions, of manipulating locations dictates.

The VCSEL radiation sources are preferably conditioned so as to emit laser light in the Laguerre-Gaussian mode, with a Laguerre-Gaussian spatial intensity distribution.

The one or more VCSELs are preferably disposed orthogonally to a surface, normally a major surface, of the body, normally a planar substrate, in which is present the microfluidic channel, laser light from at least one VCSEL, and normally all VCSELs, impinging substantially orthogonally on both the body and its microfluidic channel.

The microfluidic channel normally has a junction where an upstream, input, fluidic pathway bifurcates into at least two alternative, downstream, fluidic pathways. The presence or absence of the radiation at this junction then determines whether a particle contained within fluid flowing from the upstream fluidic pathway through the junction is induced to enter a one, or another, of the two alternative, downstream, fluidic pathways.

The two alternative, downstream, fluidic pathways of the microfluidic channel may be, and preferably are, separated in a "Z" axis direction orthogonal to the plane of the substrate. The presence or absence of the laser light from the VCSEL at the junction thus selectively forces the particle in a "Z" axis direction, orthogonal to the plane of the substrate, in order to determine which one of the two alternative, downstream, fluidic pathways the particle will enter.

However, the two alternative, downstream, fluidic pathways of the microfluidic channel may be separated in different directions in the plane of the substrate, the at least two alternative downstream, fluidic pathways then being of the topology of the arms of an inverted capital letter "Y", or, topologically equivalently, of the two opposing crossbar segments of an inverted capital letter "T". The presence or absence of the laser light from the VCSEL at the junction then selectively forces the particle to deviate in direction of motion in the plane of the substrate, therein to determine which branch one of the two alternative, downstream, fluidic pathways the particle will enter.

5. An Optical Tweezing Method

In still yet another of its aspects the present invention may simply be considered to be embodied in a new method of optically tweezing a small particle.

The method consists of transporting the small particle in fluid flowing within a microfluidic channel, and then manipulating the small particle with laser light as it is transported by the flowing fluid within the channel.

The manipulating laser light is preferably from a Vertical Cavity Surface Emitting Laser (VCSEL), and still more preferably has a substantial Laguerre-Gaussian spatial energy distribution.

In the method a number of particles each in an associated microfluidic channel may each be illuminated in and by the laser light of an associated single Vertical Cavity Surface Emitting Lasers (VCSELs), all at the same time.

Alternatively, in the method multiple particles may be illuminated at multiple locations all within the same channel, and all at the same time.

The laser light illumination of the particle moving in the microfluidic channel under force of fluid flow is preferably substantially orthogonal to a local direction of the channel, and of the particle movement.

6. A Microfluidic Device

In still yet another of its aspects the present invention may be considered to be embodied in a microfluidic device for sorting a small particle within, and moving with, fluid flowing within microfluidic channels within the device.

The microfluidic device has a housing defining one or more microfluidic channels, in which channels fluid containing at least one small particle can flow, at least one microfluidic channel having at least one junction, said junction being a place where a small particle that is within a fluid flow proceeding from (i) a location within a microfluidic channel upstream of the junction, through (ii) the junction to (iii) a one of at least two different, alternative, microfluidic channels downstream of the junction, may be induced to enter into a selected one of the two downstream channels.

The device further has a flow inducer for inducing an upstream-to-downstream flow of fluid containing the at least one small particle in the microfluidic channels of the housing and through the junction.

Finally, the device has a source of optical, or photonic, forces for selectively producing photonic forces on the at least one small particle as it flows through the junction so as to controllably direct this at least one small particle that is within the fluid flow into a selected one of at the least two downstream microfluidic channels.

By this coaction the at least one small particle is transported from upstream to downstream in microfluidic channels by the flow of fluid within these channels, while the same small particle is sorted to a selected downstream microfluidic channel under a photonic force.

As before, a junction where sorting is realized may be in the topological shape of an inverted "Y" or, topologically equivalently, a "T", where a stem of the "Y", or of the "T", is the upstream microfluidic channel, and where two legs of the "Y", or, topologically equivalently, two segments of the crossbar of the "T", are two downstream microfluidic channels. Alternatively, a junction where sorting is realized may be in the shape of an "X", where two legs of the "X" are upstream microfluidic channels, and where a remaining two legs of the "X" are two downstream microfluidic channels.

In all configurations the photonic pressure force pushes the at least one small particle in a selected direction.

These and other aspects and attributes of the present invention will become increasingly clear upon reference to the following drawings and accompanying specification.

BRIEF DESCRIPTION OF THE DRAWINGS

Referring particularly to the drawings for the purpose of illustration only and not to limit the scope of the invention in any way, these illustrations follow.

DESCRIPTION OF THE PREFERRED EMBODIMENT

Figure 1:
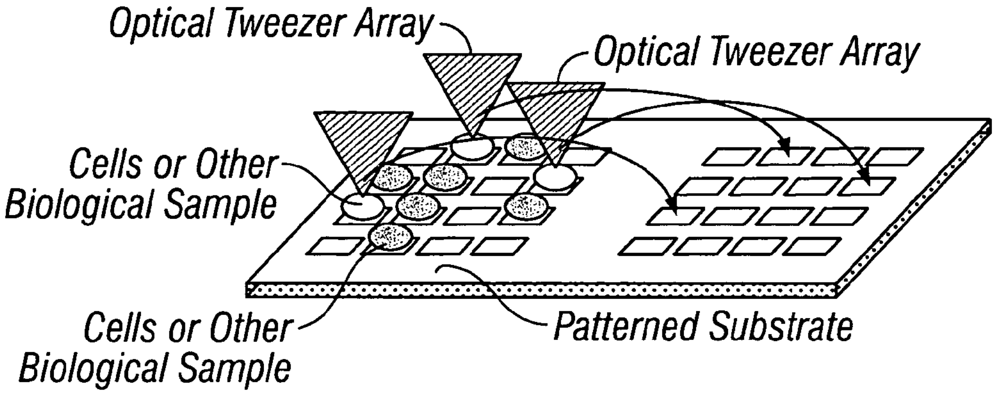
FIG. 1 is a diagrammatic representation showing VCSEL array optical tweezers in accordance with the present invention for the parallel transport of samples on a chip.

The following description is of the best mode presently contemplated for the carrying out of the invention. This description is made for the purpose of illustrating the general principles of the invention, and is not to be taken in a limiting sense. The scope of the invention is best determined by reference to the appended claims.

Although specific embodiments of the invention will now be described with reference to the drawings, it should be understood that such embodiments are by way of example only and are merely illustrative of but a small number of the many possible specific embodiments to which the principles of the invention may be applied. Various changes and modifications obvious to one skilled in the art to which the invention pertains are deemed to be within the spirit, scope and contemplation of the invention as further defined in the appended claims.

1. Theory of the Invention for All-Optical Switching of Biological Samples in a Microfluidic Device The present invention uses photonic pressure to implement directed switching and sorting of microparticles.

In its most basic and rudimentary form a photonic switching mechanism in accordance with the present invention uses an optical tweezers trap. Channels, most typically formed by molding a silicone elastomer, are used to guide a fluid, such as, by way of example, water, flowing, typically continuously, in a path having the shape of an inverted letter "Y" between, by way of example, one input reservoir and two output reservoirs. In accordance with the present invention, microspheres dispersed in the water continuously flowing through the input micro-channel that forms the central leg of the "Y" are selectively directed by optical radiation pressure to a determined output channel, or a selected branch leg of the "Y". All-optical sorting is advantageous in that it can provide precise and individual manipulation of single cells or other biological samples regardless of their electrical charge or lack thereof.

Optical tweezers have been combined with micro-fabricated fluidic channels to demonstrate tile photonic sorter. In optical tweezers, the scattering of photons off of a small particle provides a net attractive or repulsive force depending on the index of refraction of the particle and the surrounding fluid. Previous demonstrations of the optical manipulation of objects through defined fluidic channels used photonic pressure to transport cells over the length of the channels. In contrast, the device described in this paper employs photonic pressure only at the switching junction, while long distance transport of the cells is achieved by continuous fluid flow. In the concept depicted in FIG. 1, cells or functionalized microspheres are entered into a T-shaped fluidic channel. It is desired that each sample should be sequentially identified (either by fluorescence or some other means) and then directed into one of the two branches of the "T" depending on its type. Sorting is achieved at the junction of the channel by capturing the sample in an optical trap and then drawing it to either the left or right side of the main channel. Provided that the fluidic flow is non-turbulent, when the sample is released it will naturally flow out the closest branch of the junction. The sorted samples may be collected or sent into further iterations of sorting.

Optical sorting in this manner may have a number of advantages over electrical sorting depending on the test and the type of cell. Some biological specimens—and the normal functions occurring within those specimens—may be sensitive to the high electric fields required by electrophoresis. In this case, photonic momentum transfer may be a less invasive process and can also be effective even when the charge of the sample is neutral or not known. Optical switching can provide precise, individual control over each particle. Additionally, while large arrays of sorting devices are envisioned on a single bio-chip to increase throughput, it may be difficult to address such large arrays electrically. Optical addressing may allow greater flexibility in this respect as device size scales.

2. Theory of the Present Invention for the Integration of Optoelectronic Array Devices for Cell Transport and Sorting In accordance with the present invention VCSEL arrays can serve as optical tweezer arrays. Tweezer arrays that are independently addressable can beneficially be used to both (i) transport and (ii) separate samples of microparticles, including in a bio-chip device integrating both the microchannels and the VCSEL arrays.

In accordance with the present invention, photonic momentum from the VCSEL laser light (from each of arrayed VCSELs) is used as to realize multiple parallel optical switches operating in parallel in multiple microfabricated microfluidic fluidic channels, and/or, in multiple locations in each microfluidic channel. Most typically everything—fluid flow, positional tweezing and translation of microparticles, sorting of microparticles, etc.—proceeds under computer control, permissively with parallelism between different "lines" as in an "on-chip chemical (micro-)factory", and with massive parallelism between same or similar lines running same or similar processes such as for analysis of proteins or the like such as in an "on-chip micro chemical reactor and product assessment system". Everything can transpire in a relatively well-ordered and controllably-sequenced matter because light—the controlling factor for all but fluid flow, and optically-controlled valves can control even that—is input remotely into the microfluidic structure, which is made on a substrate out of optically transparent materials. Non-contact of the switching and controlling devices—preferably a large number of VCSEL lasers—and the microfluidic channels and the fluid(s) and particle(s) flowing therein therefore simplifies fabrication of both the microfluidics and the controlling (VCSEL) lasers, and substantially eliminates cross-contamination.

It should be considered that this "control at a distance") (albeit, and as dimensions dictate, but a small distance), and via non-contaminating and non-interfering light to boot, is very unusual in chemical or biochemical processing, where within the prior art (other than for the limited functionality of prior art optical tweezers themselves) it has been manifestly necessary to "contact" the material, or bio-material, that is sought to be manipulated. The present invention must therefore be conceived as more than simply a device, and a method, for sorting microparticles but rather as a system for doing all aspects of chemistry and biochemistry at a distance, and remotely, and controllably—at micro scale! Something thus arises in the micro realm that is not possible in the macro realm.

3. Theory of the Present Invention for the Implementation of VCSEL Optical Tweezers, Including as are Implemented as Arrays In accordance with the present invention an optical tweezer may be implemented with one single vertical cavity surface emitting laser (VCSEL) device. An array of VCSELs may be used as a parallel array of optical tweezers that, as selectively controlled both individually and in concert, increase both the flexibility, and the parallelism, in the manipulation of microparticles.

The VCSELs are normally arrayed on a single chip, and, with their vertically-emitted laser beams, serve to manipulate microparticles on the surface of the chip, or on a facing chip including as may have and present channels, including channels as may also contain and/or flow fluids.

Although the most preferred VCSEL arrays are made from VCSELs modified (by a post-fabrication annealing process) to emit laser light most pronouncedly in a high-order Laguerre-Gaussian mode (as opposed to a Hermite-Gaussian mode), optical pressure forces from various still higher-power light sources can be used, particularly for the fast switching of particles within microfluidic channels.

In the most preferred implementation of arrayed optical tweezers each VCSEL in an array of VCSELs (i) emits in the Laguerre-Gaussian mode, (ii) with the emitted laser beam being focused, so as to individually act as a single trap. In this manner, precise uniformity or selective control over each trap can be achieved by appropriately modulating the current to each VCSEL. The VCSEL arrays are (i) compact (ii) reliable and long-lived, and (iii) inexpensive of construction on (iv) substrates that are compatible with other opto-electronic functions that may be desired in a bio-chip—such as arrayed detectors.

Both polystyrene microspheres and live cells both wet and dry are suitably tweezed and manipulated in diverse manners by both individual and arrayed VCSEL laser beams. For example, both (i) the attractive gradient force and (ii) the scattering force of a focused VCSEL optical beam have variously been used to direct, or to "switch", small particles flowing through junctions molded in PDMS.

The VCSEL based tweezers, and still other VCSEL arrays, of the present invention are suitably integrated as optical array devices performing, permissively simultaneously, both detection and manipulation. For example, one side of a transparent die defining and presenting microfluidic channels and switching junctions may be pressed flat against a combination stimulating and sensing chip that can, by way of example, both (i) stimulate the emission of, by way of example, fluorescent light from (only) those ones of suitably positioned sample particles or cells that appropriately emit such light as an indication of some characteristic or state, and, also, (ii) sense the fluorescent light so stimulated to be selectively emitted, including so as to ultimately provide an indicating signal to digital computer or the like. This (i) stimulating and (ii) sensing is done in one or more "upstream" locations, including in parallel.

The other side of the same transparent die having the microfluidic channels and switching junctions may be set flat against an array of VCSELs, each VCSEL "addressing", and associated switching junction most commonly downstream of some sensing location. As each particle moves by it may be selectively "switched" into one or another channel, including under computer control. In this manner highly parallel and cost effective cell analysis and sorting may he achieved.

4. Particular VCSEL Optical Tweezers in Accordance with the Present Invention

Optical tweezers and tweezer arrays have historically been generated in a number of ways including through the use of a rapid scan device, diffractive gratings or a spatial light modulator. Typical implementations of these techniques use the beam from a single high powered laser that is temporally or spatially divided among the various optical spots that are generated.

In implementation of optical tweezers and tweezer arrays in accordance with the present invention Vertical Cavity Surface Emitting Lasers (VCSELs) and VCSEL arrays are used where each VCSEL laser in the array is focused so as to individually act as trap See FIG. 1. In this manner, precise uniformity or selective control over each trap can be achieved by appropriately modulating the current to each VCSEL. VCSEL arrays provide a compact package, they are potentially very cheap, and the substrate is compatible with other optoelectronic functions that may be desired in a bio-chip such as array detectors.

Figure 2A:
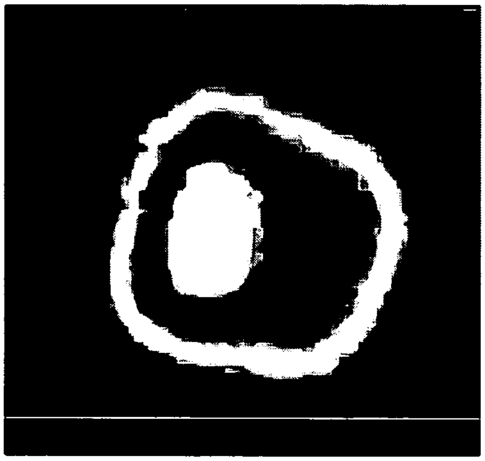
FIG. 2, consisting of FIGS. 2*a* and 2*b*, are pictures of the energy distribution of typical Hermite-Gaussian and Laguerre-Gaussian spatial energy distribution emission modes each from an associated VCSEL.
Figure 2B:
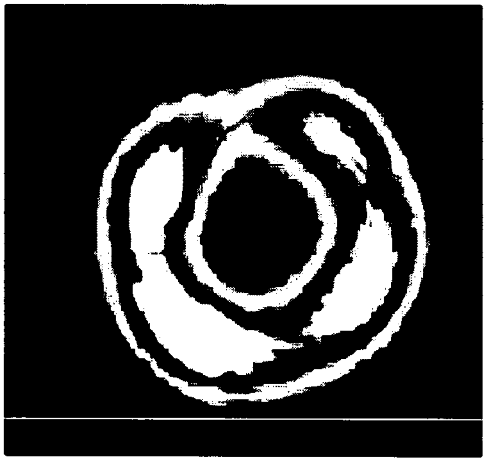
Figure 3A:
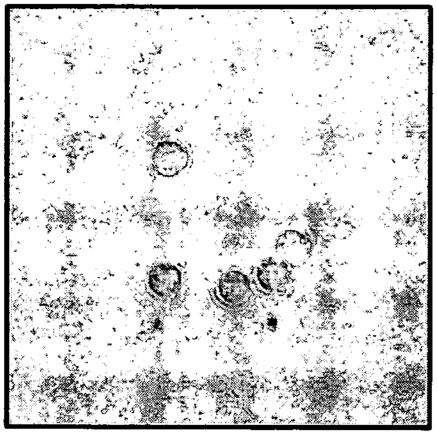
FIG. 3, consisting of FIGS. 3*a* through 3*d*, is a sequence of images showing the capture (1 and 2, FIGS. 3*a* and 3*b*), horizontal translation (3, FIG. 3*c*) and placement (4, FIG. 3*d*) of a 5 μm microsphere by a VCSEL-driven optical trap.
Figure 3B:
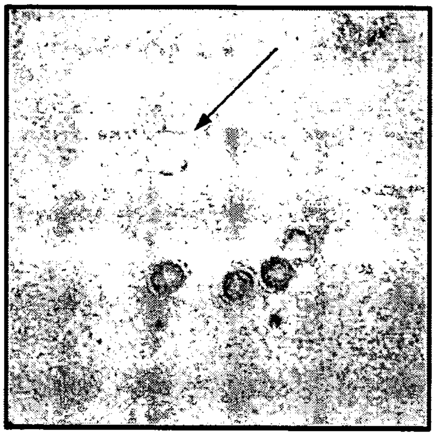
Figure 3C:
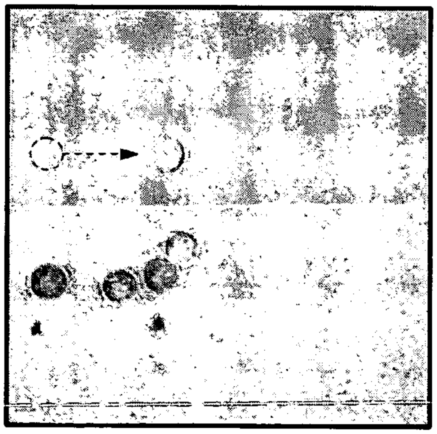
Figure 3D:
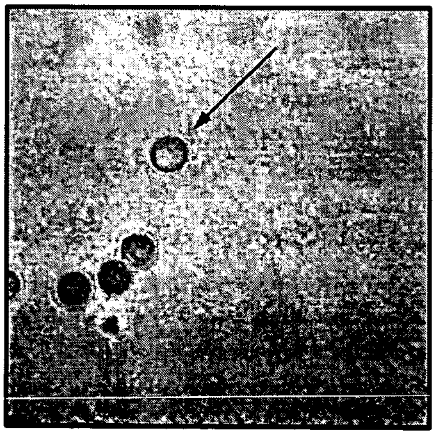
Figure 4A:
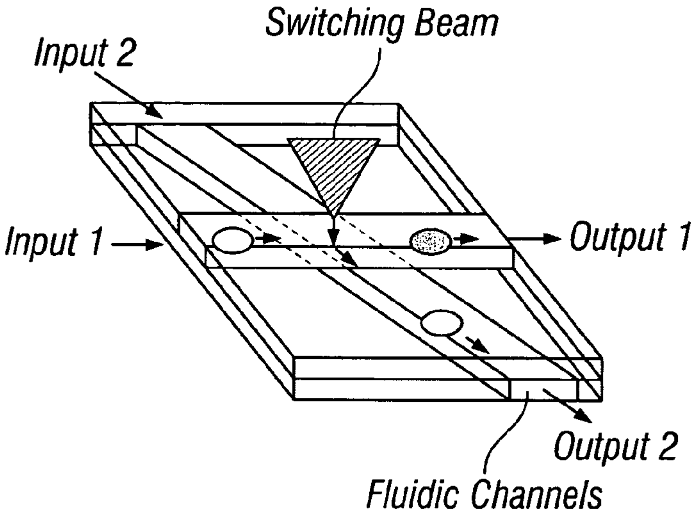
FIG. 4, consisting of FIGS. 4*a*–4*c*, is a diagram respectively showing in perspective view (FIG. 4*a*) and two side views with the optical beam respectively "off" (FIG. 4*b*) and "on" (FIG. 4*c*), the scattering force from an optical beam acting as an "elevator" between two fluidic channels at different levels in a three-dimensional PDMS structure; when the optical beam is "off" (FIG. 4*b*) a particle will flow straight through the junction; however when the optical beam is "on" (FIG. 4*c*), a particle will be pushed into the intersecting channel.
Figure 4B:
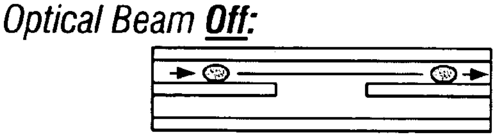
Figure 4C:
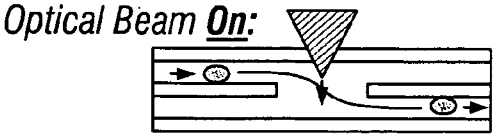
Figure 5A:
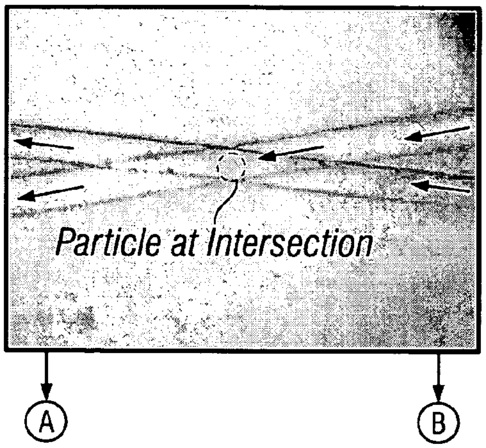
FIG. 5, consisting of FIGS. 5*a* through 5*c*, are diagrams of particle switching using optical scattering force; fluid is drawn through two overlapping channels at a constant rate; at the intersection of the two channels a 5 μm microsphere will either remain in the its original channel or be pushed by an incipient optical beam into the opposite channel.
Figure 5B:
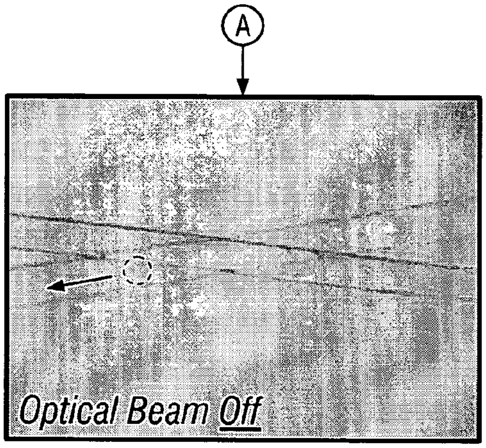
Figure 5C:
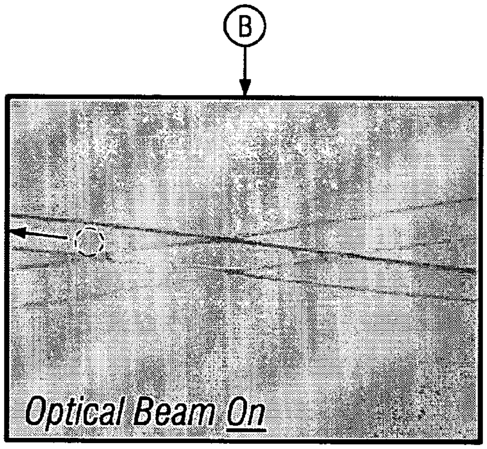
Figure 6:
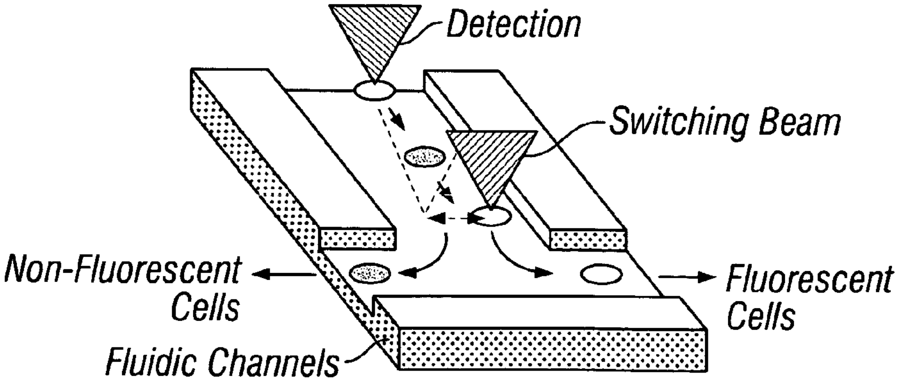
FIG. 6 is a diagrammatic illustration of the concept of the present invention for an all optical microfluidic flow cytometer for the separation of different cell species; samples are injected into the input port sequentially and directed to one of two output parts by the attractive trapping force of an optical tweezer beam.

The main drawback of VCSELs as optical tweezers is their relatively low output power, and therefore low trapping strength. In accordance with the present invention, this disadvantage is at least partially compensated by permanently changing the lasing mode of the VCSEL prior to use. In accordance with the technique of U.S. patent application Ser. No. 09/451,248, the contents of which application are incorporated herein by reference, the spatial emission mode of a packaged midsize proton-implant VCSEL is converted from a Hermite-Gaussian mode to a Laguerrs-Gaussian mode through a simple past-fabrication annealing process. Laguerre modes are characterized by their rotational symmetry and in higher orders can very closely resemble the so-called "donut" mode. Shown in FIG. 2 is a comparison of the fundamental R Gaussian mode emitted from a VCSEL of FIG. 2*a* to the high-order LaGuerre mode of FIG. 2*b*. The energy of the emitted beam is moved to the outer edge of the ii aperture where, in an optical trap, photons have the greatest axial restoring force. Energy has been removed from the center of the beam, thereby decreasing the detrimental scattering force that acts to push particles out of the trap.

Optical trapping of polystyrene microspheres dispersed in water has been successfully demonstrated using an 850 nm, 15 μm diameter aperture, LaGuerre mode VCSEL. A 100×, 1.5 N. A. microscope objective was used to focus the optical beam from the VCSEL onto a sample plate. FIG. 3 shows a sequence of images captured by a CCD camera in which a single 5 μm diameter microsphere has been trapped, horizontally translated, and released. The full three-dimensionality of the trap was verified by translating along all axes, and also by observing that when stationary Brownian motion alone was insufficient to remove the particle from the trap.

The strength of this trap was measured by translating the beads at increasingly higher speeds through water and observing the point at which fluidic drag exceeded the optical trapping force. For a 10 μm diameter microsphere and a VCSEL driving current of 18 mA, a maximum drag speed of 6.4 μm/sec was observed, corresponding to a lateral trapping force of 0.6 picoNewtons. Smaller live cells (<5 μm) obtained from a mouse were also shown to be trapped by the VCSEL tweezers. However the strength of the trap was considerably less due to the lower dielectric constant and irregular structure of cells.

The use of a VCSEL array in accordance with the present invention for the simultaneous transport of multiple particles, also in accordance with the present invention, has been demonstrated. Optical beams from three VCSELs in a 1×3 linear array were similarly focused as in FIG. 3 through a microscope objective to the sample plate. The device spacing on the optoelectronic chip was 250 um. After demagnification the trap spacing at the image plane was 13 um. Three 5 gm microspheres were captured and translated simultaneously. This small scale demonstration indicates that much larger two-dimensional tweezers arrays with VCSEL devices are possible.

Figure 7A:
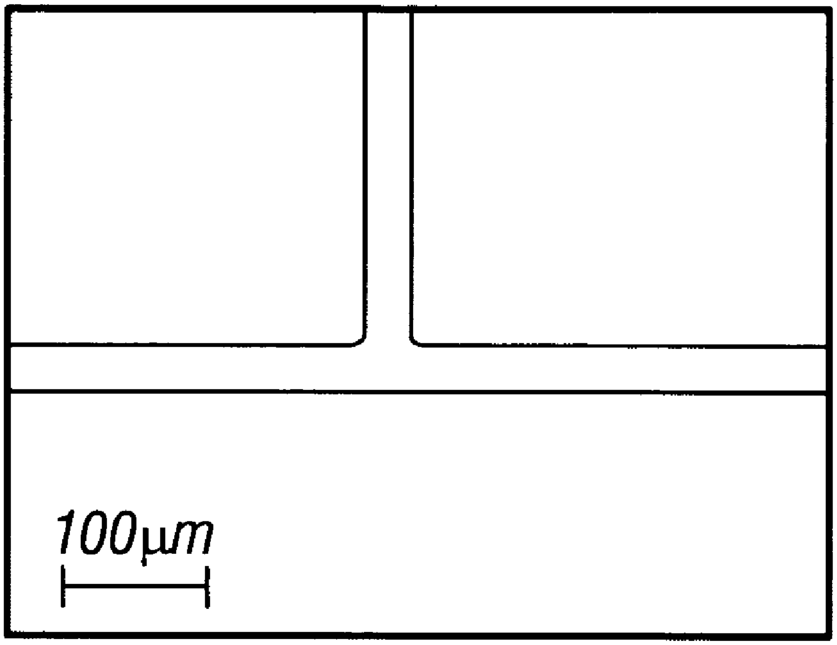
FIG. 7, consisting of FIGS. 7*a* through 7*d*, respectively show microfluidic "T", "Y", 1-to-N and M-to-N channels fabricated in PDMS in accordance with the present invention; a typical channel width being 40 μm.
Figure 7B:
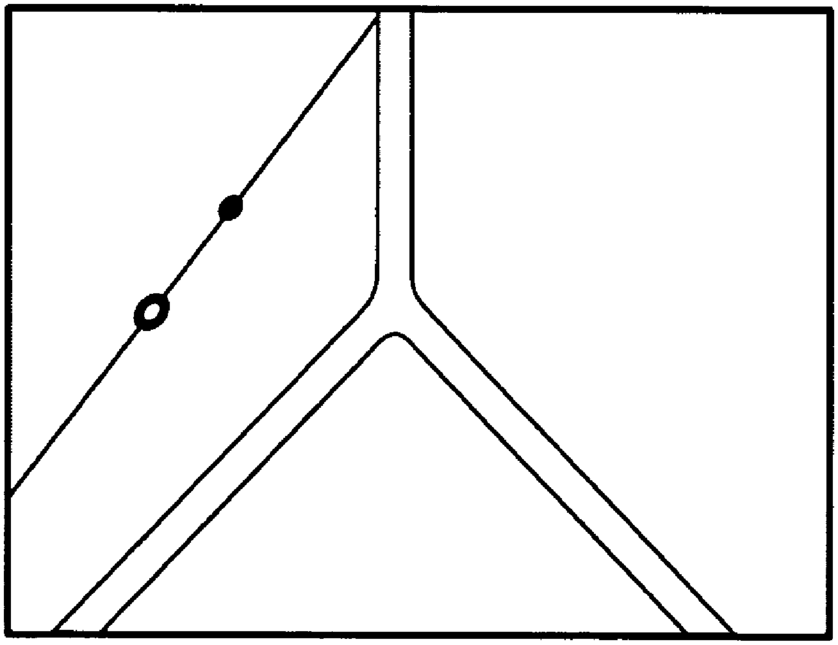
Figure 7C:
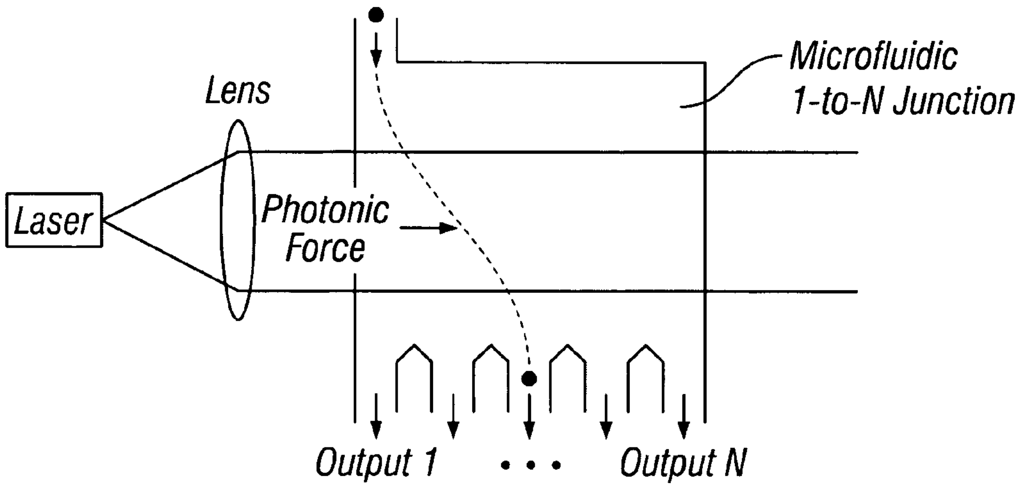
Figure 7D:
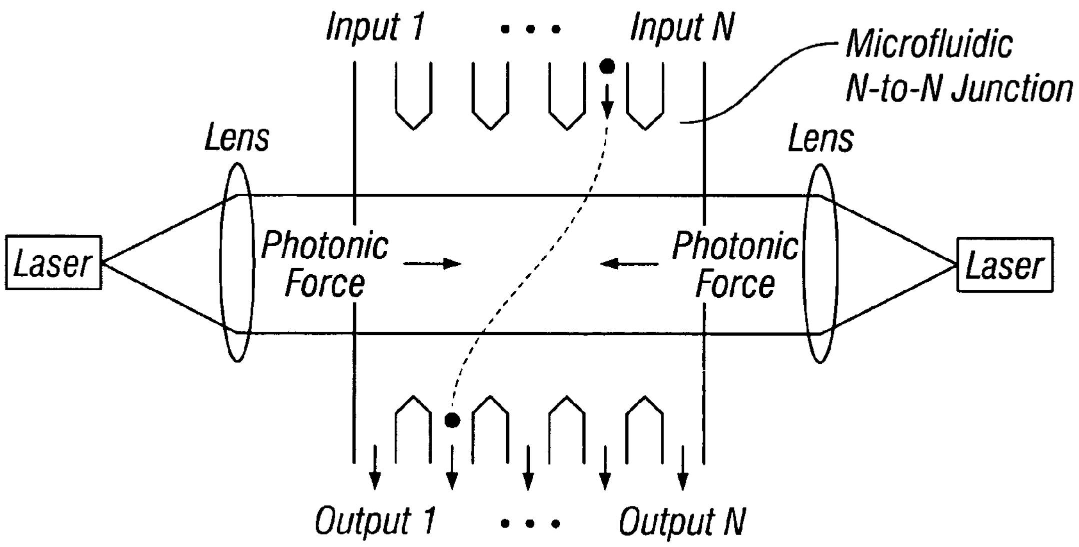

The feasibility of photonic particle switching in microfluidic channels has also been demonstrated. In initial experiments polystyrene beads were used to simulate the sorting of live cells. Microfluidic channels were fabricated in a PDMS-based silicone elastomer (Dow Corning Sylgard 184). The channels were molded by a lithographically-defined relief master. Samples were cured at room temperature over a period of 24 hours. After curing, the channels were treated in a 45 C 1-ICI bath (0.02%, in water) for 40 minutes to increase their hydrophilicity. As shown in FIGS. 7*a* and 7*b*, both T-shaped and Y-shaped channels were fabricated. Similar results were obtained with each. Channels widths of 20 Am and 40 Am with depths ranging from 10 to 20 Am and lengths from 2 to 4 mm were shown. To seal the channels the molded elastomer was capped by a microscope slide cover slip. Reservoirs at the end of each channel were left open to permit the injection of fluid. Additionally, a gold electrode was inserted into each reservoir to permit an electro-osmotic flow to be induced within the channels. A combination of electro-osmosis and pressure was used to draw the fluids down the main channel, while sorting was performed purely by photonic pressure. Electro-osmotic fluid flow is a convenient tool for microchannels of this size, however mechanical pumping can also be used. Microspheres ranging in diameter from 0.8 Um to 10 Am were dispersed in water and shown to flow through the channels.

Figure 8:
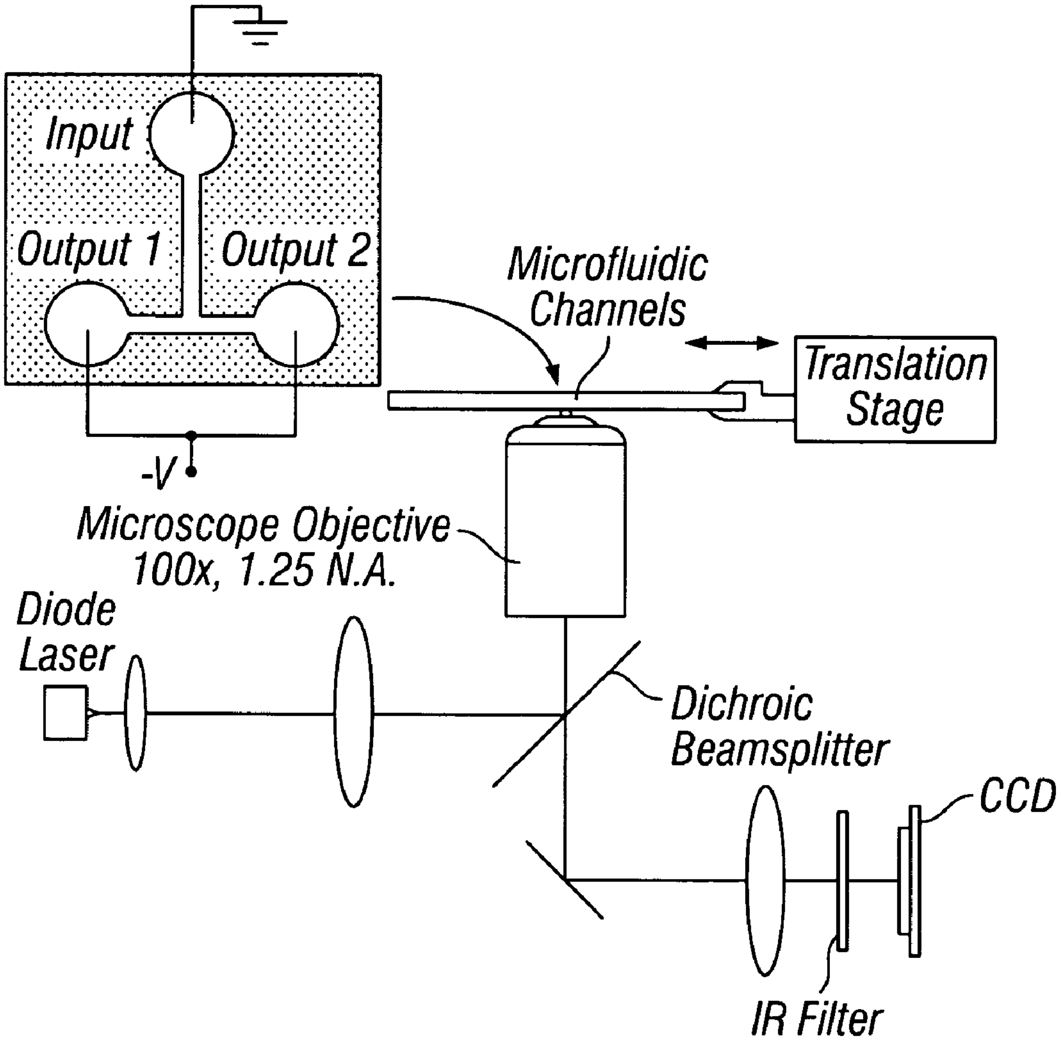
FIG. 8 shows a photonic sorting device in accordance with the present invention where (i) microfluidic channels are mounted into an optical tweezers and microscope setup; (ii) an optical beam is focused to a point at the junction of the channels; (iii) a voltage is applied to the channels to induce fluid flow; and (iv) sorting progress is monitored on a CCD camera.
Figure 9A:
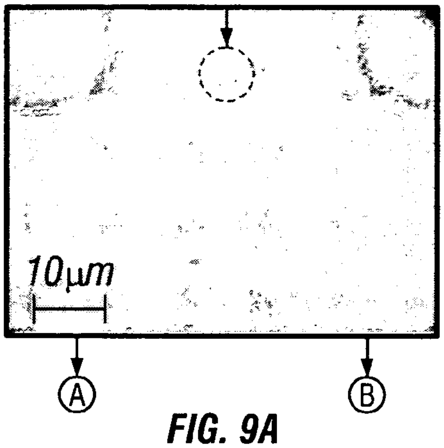
FIG. 9, consisting of FIGS. 9*a* through 9*e*, is a sequence of images demonstrating the photonic switching mechanism of the present invention where (i) microspheres flow in to a channel junction from an input port at the top; (ii) the microspheres are first captured (a) by an optical tweezer trap; (iii) the position of the microsphere is translated laterally to either the left or the right (B); and (iv) the microsphere is then released from the trap (C) and allowed to follow the fluid flow into either the left or right output parts. The dotted circle indicates the position of the optical trap. Where each of the two exit channels is equal, the microsphere will flow to its nearest exit channel (C).
Figure 9B:
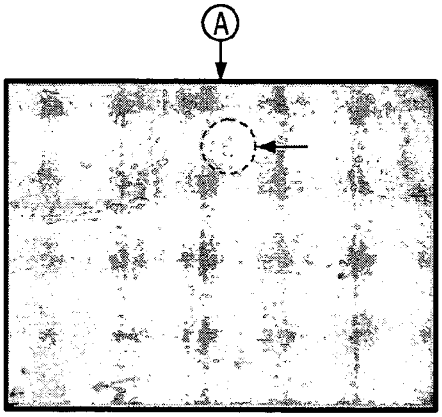
Figure 9D:
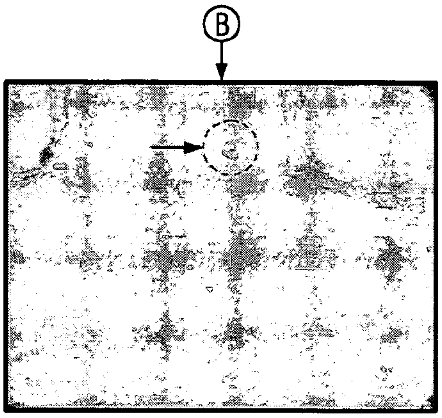
Figure 9C:
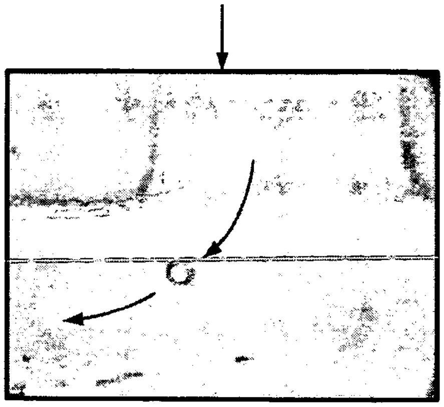
Figure 9E:
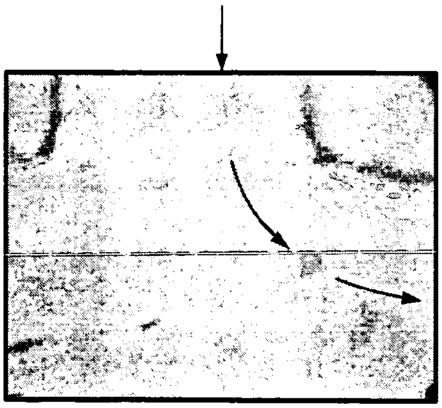

The setup for the optical sorter is shown in FIG. 8. The beam from a 70 mW, 850 nm diode laser is focused through the microscope slide cover slip onto the channels. The 100×, 1.25 numerical aperture microscope objective makes a highly focused spot, therefore allowing three-dimensional optical trapping. The position of the optical trap is moved by translating the mounted channels over the beam. Prior calibration of the optical trap strength at this power and for 5 μm diameter microspheres demonstrated a holding force of 2.8 picoNewtons. For this force the optical trap should be able to overcome the fluidic drag force of water for linear flow rates of up to 60 μm/sec.

A demonstration of the switching process is depicted in the sequence of images in FIGS. 9*a*–9*e*. The images shown here are magnified to the junction of the “T”. The fluidic channels in this case were 40 μm wide and 20 μm deep. The optical trapping beam is not visible in these pictures due to the IR-blocking filter in front of the CCD camera. Microspheres with a diameter of 5 μm were drawn from the entry port with a linear fluidic velocity of approximately 30 μm/sec. The linear velocity is halved at the exit ports since each exit channel has the same cross-sectional area as the input channel. The potential difference between the entry and exit ports was 16 V.

As a sphere enters the viewing area it is first captured by the optical trap (A). It is then manually translated laterally to either the left or right side of the channel (B) and then released. Because the fluid flow into each of the two channels is equal, the microsphere will flow to its nearest exit channel (C).

It was determined that smaller objects were more easily trapped and transported. Larger objects feel a greater force due to the fluidic drag. Moreover, we have determined that live cells are also more difficult to manipulate in an optical trap due to the lower average index of refraction and irregular shape. Higher optical beam power levels are necessary to rapidly switch these types of particles.

Having shown the operation of the optical switching mechanism of the present invention, it is now explained how this may be integrated into a full sorting system including detection optics. Ideally, the trapping and translating motion should be automated, preferably by an actuating micromirror device or similar method. In addition, it should not be necessary to fully trap a sample, provided that sufficient momentum transfer can occur to displace the sample to one side. The laser power used in this application is high because the trapping force must overcome the drag force of the fluid. Implementing the optical trap from the top of the fluidic channels is inherently inefficient since most of the photonic momentum is directed downwards instead of sideways. In preferred implementations the laser beam is input from either side of the channel, either by focused beams or through integrated waveguides. By bringing the photons in from the sides of the channel, a much stronger “push” force can be achieved with much lower laser powers.

5. Conclusion

The present specification has shown and described an all-optical switching device for particles flowing through microfluidic channels, and methods of positionally translating, and switching, the particles. Important applications of such a device and such methods include sorting of cells and other biological samples both for biotech research as well as therapeutic medicine.

Photonic implementations of sample interrogation as well as manipulation have some advantages over purely electrical implementations, particularly in terms of reducing the chance of external influences. Preliminary viability tests performed on living fibroblast cells exposed to the optical trap beam showed that the cells continue to grow and reproduce normally. The use of vertical cavity surface emitting laser (VCSEL) arrays in multiple, independently-addressable optical traps is currently under active development. An integrated combination of both photonic and electronic devices should permit greater complexity and capability to be achieved in bio-chip technology.

In accordance with the preceding explanation, variations and adaptations of the optical tweezing and transporting and switching methods and devices in accordance with the present invention will suggest themselves to a practitioner of the optical design arts. For example, the VCSELs that preferably serve as optical tweezers can be arrayed in one, two and three dimensional arrays for controlling particulate movement and switching in one, two or three dimensions. The VCSELs can be, for example, colored—meaning centered upon a certain emission wavelength—as will make their radiation emission to act more, or less, strongly on various species, and states, of particles—thus potentially making that sensing can be dispensed with, and that switching will be both automatic and continuous dependent only upon particle coloration.

Other variations and modifications are possible based on the disclosure of this application.

What is claimed is:

1. A microfluidic sorting device comprising:

a substrate having a main microfluidic channel that branches into a plurality of microfluidic branch channels, the main microfluidic channel and the plurality of microfluidic branch channels adapted to contain a moving fluid having particles disposed therein; and a light source that produces at least one light beam directed at the main microfluidic channel, the light beam selectively switching the particles into the plurality of microfluidic branch channels without optically trapping the particles.

2. The microfluidic sorting device of claim 1, wherein the particles comprise cells.

3. The microfluidic sorting device of claim 2, wherein the particles comprise live cells.

4. The microfluidic sorting device of claim 1, wherein the particles comprise biological samples.

5. The microfluidic sorting device of claim 1, wherein the substrate includes a top surface and a bottom surface, the light beam being directed at the main microfluidic channel through one of the top surface and the bottom surface.

6. The microfluidic sorting device of claim 1, wherein the substrate includes one or more side surfaces, the light beam being directed at the main microfluidic channel through one of the side surfaces.

7. The microfluidic sorting device of claim 1, wherein the substrate includes a microlens disposed therein to guide the at least one light beam.

8. The microfluidic sorting device of claim 1, wherein the substrate includes an optical waveguide disposed therein.

9. The microfluidic sorting device of claim 1, wherein the at least one light beam directed at the main microfluidic channel is stationary.

10. The microfluidic sorting device of claim 1, wherein the at least one light beam directed at the main microfluidic channel is translated relative to the substrate.

11. The microfluidic sorting device of claim 1, wherein the light source comprises a laser.

12. The microfluidic sorting device of claim 1, wherein the light source comprises a Vertical Cavity Surface Emitting Laser (VCSEL).

13. The microfluidic sorting device of claim 1 further comprising, at least one of the plurality of microfluidic branch channels branching further into a plurality of sub-branch channels, and an additional light source that produces at least one additional light beam directed at the at least one branch channel, the additional light beam selectively switching the particles into the plurality of sub-branch channels with non-trapping radiation pressure.

14. A microfluidic sorting device, comprising:

a main microfluidic channel to conduct a moving fluid flow comprising particles;

at least one branching junction in the main microfluidic channel;

a plurality of microfluidic branch channels connected to the at least one branching junction to branch at least a portion of the moving fluid flow into a plurality of branch moving fluid flows respectively in the microfluidic branch channels; and at least one control module that directs at least one light beam at the main microfluidic channel to optically switch particles in the moving fluid flow into at least one of the microfluidic branch channels without optical trapping.

15. The device as in claim 14, further comprising a flow inducer to cause fluid flow in the main microfluidic channel and the microfluidic branch channels.

16. The device as in claim 14, wherein the at least one control module directs the at least one light beam perpendicular to a plane formed by at least two of the microfluidic branch channels.

17. The device as in claim 14, wherein the at least one control module directs the at least one light beam within a plane formed by at least two of the microfluidic branch channels.

18. The device as in claim 14, further comprising at least one lens to direct the at least one light beam to the main microfluidic channel.

19. The device as in claim 18, further comprising a substrate on which the main microfluidic channel and the microfluidic branch channels are formed, wherein the lens is a microlens fabricated in the substrate.

20. The device as in claim 14, further comprising at least one wave guide to direct the at least one light beam to the main microfluidic channel.

21. The device as in claim 20, further comprising a substrate on which the main microfluidic channel and the microfluidic branch channels are formed, wherein the wave guide is fabricated in the substrate.

22. The device as in claim 14, further comprising a mechanism to further sort sorted particles in one of the microfluidic branch channels.

23. The device as in claim 14, further comprising a mechanism to collect sorted particles from one of the microfluidic branch channels.

24. The device as in claim 14, further comprising a detection mechanism located upstream in the main microfluidic channel from a location where the at least one light beam intercepts with the main microfluidic channel.

25. The device as in claim 14, wherein the at least one control module is configured to use at least one light beam to translate a position of the selected particle to direct the selected particle in the moving fluid flow into the at least one of the microfluidic branch channels.

26. The device as in claim 25, wherein the at least one control module comprises a micro-mirror device which operates to translate a position of the selected particle.

27. The device as in claim 14, wherein the at least one control module is configured to use the at least one light beam to optically push a selected particle in the moving fluid flow into the at least one of the microfluidic branch channels without optically trapping the selected particle.

28. The device as in claim 14, wherein the at least one control module is configured to use the at least one light beam to optically pull a selected particle in the moving fluid flow into the at least one of the microfluidic branch channels without optically trapping the selected particle.

29. The device as in claim 14, further comprising a sensing mechanism to optically sense particles in the main microfluidic channel, and wherein the at least one control module acts on a sensing result of the sensing mechanism to select and optically switch the particles in the main microfluidic channel.

30. The device as in claim 14, wherein the at least one control module operates to select a particle according to an emission wavelength of the particle.

31. The device as in claim 14, wherein the at least one control module comprises a stimulation mechanism to optically stimulate emission from the particles in the main microfluidic channel, and a sensing mechanism to sense fluorescent light emitted by optically stimulated particles.

32. The device as in claim 31, wherein the at least one control module acts on the sensed fluorescent light to optically switch the particles in the main microfluidic channel.

33. A method for optically sorting particles in a flowing fluid, comprising:

supplying a flowing fluid comprising particles to a main microfluidic channel that branches at at least one junction into at least two branch microfluidic channels; and using at least one optical beam to optically switch particles in the main microfluidic channel into at least one of the at least two branch microfluidic channels without optical trapping.

34. The method as in claim 33, further comprising using the at least one optical beam to optically switch cells in the main microfluidic channel.

35. The method as in claim 34, wherein the cells in the main microfluidic channel comprise live cells.

36. The method as in claim 33, further comprising using the at least one optical beam to optically switch biological samples in the main microfluidic channel.

37. The method as in claim 33, further comprising directing the optical beam in a direction substantially perpendicular to a plane formed by the at least two microfluidic branch channels.

38. The method as in claim 33, further comprising directing the optical beam in a direction substantially parallel to a plane formed by the at least two microfluidic branch channels.

39. The method as in claim 33, further comprising collecting sorted particles from a branch microfluidic channel.

40. The method as in claim 33, comprising further sorting sorted particles in a branch microfluidic channel.

41. The method as in claim 33, further comprising optically sensing particles in the main microfluidic channel, and using a sensing result from the optical sensing to select and optically switch particles in the main microfluidic channel into at least one of the at least two branch microfluidic channels.

42. The method as in claim 41, wherein the optical sensing comprises optically stimulating the particles and subsequently sensing emission from stimulated particles.

43. The method as in claim 40, further comprising using an emission wavelength of the particles to select particles.

44. The method as in claim 33, wherein the at least one optical beam is translated relative to the main microfluidic channel and the branch microfluidic channels.

45. The method as in claim 33, wherein a substrate on which the main microfluidic channel and the at least two branch microfluidic channels are formed is translated relative to the at least one optical beam.

46. The method as in claim 33, further comprising using the at least one optical beam to push a particle without optical trapping of the particle when switching the particle into one of the at least two branch microfluidic channels.

47. The method as in claim 33, further comprising using the at least one optical beam to pull a particle without optical trapping of the particle when switching the particle into one of the at least two branch microfluidic channels.

48. The method as in claim 33, further comprising using the at least one optical beam to optically switch a cell among the particles without optical trapping of the cell when switching the cell into one of the at least two branch microfluidic channels.

49. The method as in claim 33, further comprising using the at least one optical beam to optically switch a live cell among the particles without optical trapping of the live cell when switching the live cell into one of the at least two branch microfluidic channels.

50. The method as in claim 33, further comprising using the at least one optical beam to optically switch a biological sample among the particles without optical trapping of the biological sample when switching the biological sample into one of the at least two branch microfluidic channels.

* * * * *